United States Patent
Yeh et al.

(10) Patent No.: US 12,260,580 B2
(45) Date of Patent: Mar. 25, 2025

(54) SYSTEM AND METHOD FOR ENHANCING VISUAL ACUITY OF HEAD WEARABLE DISPLAYS

(71) Applicant: HES IP HOLDINGS, LLC, Austin, TX (US)

(72) Inventors: Feng-Chun Yeh, Taipei (TW); Guo-Hsuan Chen, Taichung (TW); Jiunn-Yiing Lai, New Taipei (TW); Yin Chang, Taipei (TW); Po-Ya Hsu, New Taipei (TW)

(73) Assignee: Oomii Inc., Grand Cayman (KY)

( * ) Notice: Subject to any disclaimer, the term of this patent is extended or adjusted under 35 U.S.C. 154(b) by 411 days.

(21) Appl. No.: 17/796,252

(22) PCT Filed: Feb. 8, 2022

(86) PCT No.: PCT/US2022/015717
§ 371 (c)(1),
(2) Date: Jul. 28, 2022

(87) PCT Pub. No.: WO2022/170284
PCT Pub. Date: Aug. 11, 2022

(65) Prior Publication Data
US 2023/0049899 A1  Feb. 16, 2023

Related U.S. Application Data

(60) Provisional application No. 63/217,297, filed on Jul. 1, 2021, provisional application No. 63/147,214, filed on Feb. 8, 2021.

(51) Int. Cl.
*G06T 15/00* (2011.01)
*G02B 27/00* (2006.01)
(Continued)

(52) U.S. Cl.
CPC ............ *G06T 7/70* (2017.01); *G02B 27/0093* (2013.01); *G02B 27/017* (2013.01); *G02B 27/30* (2013.01);
(Continued)

(58) Field of Classification Search
None
See application file for complete search history.

(56) References Cited

U.S. PATENT DOCUMENTS

| 4,953,961 A | 9/1990 | Ubhayakar |
| 6,454,411 B1 | 9/2002 | Trumbull |

(Continued)

FOREIGN PATENT DOCUMENTS

| CN | 102595178 A | 7/2012 |
| CN | 105527710 A | 4/2016 |

(Continued)

OTHER PUBLICATIONS

Taiwanese Office Action, dated Aug. 30, 2023, in a counterpart Taiwanese patent application, No. TW 111104638.
(Continued)

*Primary Examiner* — Joni Hsu
(74) *Attorney, Agent, or Firm* — Chen Yoshimura LLP

(57) ABSTRACT

A head wearable display system comprising a target object detection module receiving multiple image pixels of a first portion and a second portion of a target object, and the corresponding depths; a first light emitter emitting multiple first-eye light signals to display a first-eye virtual image of the first portion and the second portion of the target object for a viewer; a first light direction modifier for respectively varying a light direction of each of the multiple first-eye light signals emitted from the first light emitter; a first collimator; a first combiner, for redirecting and converging the multiple first-eye light signals towards a first eye of the
(Continued)

viewer. The first-eye virtual image of the first portion of the target object in a first field of view has a greater number of the multiple first-eye light signals per degree than that of the first-eye virtual image of the second portion of the target object in a second field of view.

25 Claims, 16 Drawing Sheets

(51) Int. Cl.
| | | |
|---|---|---|
| G02B 27/01 | (2006.01) | |
| G02B 27/30 | (2006.01) | |
| G06F 3/01 | (2006.01) | |
| G06T 7/70 | (2017.01) | |
| G06T 19/00 | (2011.01) | |

(52) U.S. Cl.
CPC .............. *G06F 3/013* (2013.01); *G06T 15/00* (2013.01); *G06T 19/006* (2013.01); *G06T 2210/41* (2013.01)

(56) References Cited

U.S. PATENT DOCUMENTS

| | | | |
|---|---|---|---|
| 9,319,674 B2 | 4/2016 | Kim et al. | |
| 9,395,543 B2 | 7/2016 | Lamb et al. | |
| 9,442,460 B2 | 9/2016 | Yoon et al. | |
| 9,576,398 B1 * | 2/2017 | Zehner ................. G02B 27/017 | |
| 9,800,844 B2 | 10/2017 | Nakahara et al. | |
| 10,222,621 B2 | 3/2019 | Wang et al. | |
| 10,467,770 B2 | 11/2019 | Sato et al. | |
| 10,554,940 B1 | 2/2020 | Ghazaryan | |
| 10,606,161 B2 | 3/2020 | Hirata et al. | |
| 11,079,601 B2 | 8/2021 | Greenberg | |
| 11,256,092 B2 | 2/2022 | Shamir et al. | |
| 11,435,572 B2 | 9/2022 | Yeoh et al. | |
| 11,493,769 B2 | 11/2022 | Wen et al. | |
| 2002/0024708 A1 | 2/2002 | Lewis et al. | |
| 2002/0122217 A1 | 9/2002 | Nakajima | |
| 2002/0180868 A1 | 12/2002 | Lippert et al. | |
| 2004/0179254 A1 | 9/2004 | Lewis et al. | |
| 2008/0117289 A1 | 5/2008 | Schowengerdt et al. | |
| 2010/0103077 A1 * | 4/2010 | Sugiyama .......... G02B 27/0172 |
| | | | 340/425.5 |
| 2010/0149073 A1 | 6/2010 | Chaum et al. | |
| 2011/0032706 A1 | 2/2011 | Mukawa | |
| 2011/0273722 A1 | 11/2011 | Charny et al. | |
| 2012/0002163 A1 | 1/2012 | Neal et al. | |
| 2012/0056799 A1 | 3/2012 | Solomon | |
| 2013/0044101 A1 | 2/2013 | Kim et al. | |
| 2013/0127980 A1 | 5/2013 | Haddick et al. | |
| 2014/0118508 A1 | 5/2014 | Yoon et al. | |
| 2014/0211289 A1 | 7/2014 | Hino et al. | |
| 2015/0022783 A1 | 1/2015 | Lee et al. | |
| 2015/0169070 A1 | 6/2015 | Harp et al. | |
| 2015/0324568 A1 | 11/2015 | Publicover et al. | |
| 2015/0326570 A1 | 11/2015 | Publicover et al. | |
| 2015/0338915 A1 | 11/2015 | Publicover et al. | |
| 2016/0004908 A1 | 1/2016 | Lundberg | |
| 2016/0033771 A1 | 2/2016 | Tremblay et al. | |
| 2016/0062459 A1 | 3/2016 | Publicover et al. | |
| 2016/0085302 A1 | 3/2016 | Publicover et al. | |
| 2016/0150201 A1 | 5/2016 | Kilcher et al. | |
| 2016/0178908 A1 | 6/2016 | Dobschal et al. | |
| 2016/0212394 A1 | 7/2016 | Nakahara et al. | |
| 2016/0238845 A1 | 8/2016 | Alexander et al. | |
| 2016/0246441 A1 | 8/2016 | Westerman et al. | |
| 2016/0274660 A1 | 9/2016 | Publicover et al. | |
| 2016/0377865 A1 | 12/2016 | Alexander et al. | |
| 2017/0027651 A1 | 2/2017 | Esterberg | |
| 2017/0068091 A1 | 3/2017 | Greenberg | |
| 2017/0078651 A1 | 3/2017 | Russell | |
| 2017/0188021 A1 | 6/2017 | Lo et al. | |
| 2017/0235931 A1 | 8/2017 | Publicover et al. | |
| 2017/0285343 A1 | 10/2017 | Belenkii et al. | |
| 2017/0299872 A1 | 10/2017 | Ou et al. | |
| 2017/0367651 A1 | 12/2017 | Tzvieli et al. | |
| 2018/0017815 A1 | 1/2018 | Chumbley et al. | |
| 2018/0032812 A1 * | 2/2018 | Sengelaub .............. G06T 7/248 |
| 2018/0081322 A1 | 3/2018 | Robbins et al. | |
| 2018/0091805 A1 | 3/2018 | Liang et al. | |
| 2018/0120559 A1 | 5/2018 | Yeoh et al. | |
| 2018/0157317 A1 | 6/2018 | Richter et al. | |
| 2018/0182174 A1 | 6/2018 | Choi | |
| 2018/0185665 A1 | 7/2018 | Osterhout et al. | |
| 2018/0246336 A1 | 8/2018 | Greenberg | |
| 2018/0249150 A1 | 8/2018 | Takeda et al. | |
| 2018/0252926 A1 | 9/2018 | Alexander et al. | |
| 2018/0262758 A1 | 9/2018 | El-Ghoroury et al. | |
| 2018/0284441 A1 | 10/2018 | Cobb | |
| 2018/0350032 A1 * | 12/2018 | Bastani ................... G06T 15/20 |
| 2019/0018479 A1 | 1/2019 | Minami | |
| 2019/0064435 A1 | 2/2019 | Karafin et al. | |
| 2019/0084419 A1 | 3/2019 | Suzuki et al. | |
| 2019/0121132 A1 | 4/2019 | Shamir et al. | |
| 2019/0146224 A1 | 5/2019 | Komori et al. | |
| 2019/0172216 A1 | 6/2019 | Ninan et al. | |
| 2019/0187473 A1 | 6/2019 | Tomizawa et al. | |
| 2019/0222830 A1 | 7/2019 | Edwin et al. | |
| 2019/0281279 A1 | 9/2019 | Peuhkurinen et al. | |
| 2019/0285897 A1 | 9/2019 | Topliss et al. | |
| 2019/0287495 A1 * | 9/2019 | Mathur .............. G02B 27/0172 |
| 2019/0293939 A1 | 9/2019 | Sluka | |
| 2019/0320165 A1 | 10/2019 | French et al. | |
| 2019/0361250 A1 | 11/2019 | Lanman et al. | |
| 2020/0090569 A1 * | 3/2020 | Hajati ...................... G09G 3/02 |
| 2020/0097065 A1 | 3/2020 | Iyer et al. | |
| 2020/0117006 A1 | 4/2020 | Kollin et al. | |
| 2020/0138518 A1 | 5/2020 | Lang | |
| 2020/0241650 A1 | 7/2020 | Kramer et al. | |
| 2021/0003900 A1 | 1/2021 | Chen | |
| 2021/0055555 A1 | 2/2021 | Chi et al. | |
| 2021/0120222 A1 | 4/2021 | Holz et al. | |
| 2022/0311992 A1 | 9/2022 | Lai et al. | |
| 2022/0326513 A1 | 10/2022 | Yeoh et al. | |

FOREIGN PATENT DOCUMENTS

| | | |
|---|---|---|
| CN | 106371218 A | 2/2017 |
| CN | 106537290 A | 3/2017 |
| CN | 107347152 A | 11/2017 |
| CN | 107438796 A | 12/2017 |
| CN | 108427498 A | 8/2018 |
| CN | 109073901 A | 12/2018 |
| CN | 109477961 A | 3/2019 |
| CN | 109716244 A | 5/2019 |
| CN | 110168419 A | 8/2019 |
| CN | 110168427 A | 8/2019 |
| JP | H4-501927 A | 4/1992 |
| JP | H08-166556 A | 6/1996 |
| JP | H09-105885 A | 4/1997 |
| JP | 2004-527793 A | 9/2004 |
| JP | 2007-121581 A | 5/2007 |
| JP | 2010-117542 A | 5/2010 |
| JP | 2011-13688 A | 1/2011 |
| JP | 5925389 B2 | 5/2016 |
| JP | 2016-180939 A | 10/2016 |
| JP | 2017-056933 A | 3/2017 |
| JP | 2018-508036 A | 3/2018 |
| JP | 2018-132756 A | 8/2018 |
| JP | 2018-533062 A | 11/2018 |
| KR | 20120069133 A | 6/2012 |
| TW | 201310974 A1 | 3/2013 |
| TW | 201416717 A | 5/2014 |
| TW | 201435654 A | 9/2014 |
| TW | 201716827 A | 5/2017 |
| TW | 201738618 A | 11/2017 |
| TW | 201805688 A | 2/2018 |
| TW | 201809214 A | 3/2018 |
| TW | I619967 B | 4/2018 |
| TW | I691739 B | 4/2020 |
| TW | 202016603 A | 5/2020 |

(56) References Cited

FOREIGN PATENT DOCUMENTS

| TW | I802826 B | 5/2023 |
|---|---|---|
| WO | 91/04508 A2 | 4/1991 |
| WO | 2016105281 A | 6/2016 |
| WO | 2018/175265 A1 | 9/2018 |
| WO | 2021092314 A1 | 5/2021 |
| WO | 2022072565 A1 | 4/2022 |

OTHER PUBLICATIONS

U.S. Office Action, dated Sep. 26, 2023, in a related U.S. Appl. No. 18/017,840.
European Search Report, dated Nov. 21, 2023, in a counterpart or related EP patent application, No. EP 20886006.4.
Taiwanese Office Action, dated Nov. 27, 2023, in a counterpart or related Taiwanese patent application, No. TW 112112456.
PCT/US2020/059317 International Search Report and Written Opinion issued on Feb. 5, 2021.
PCT/US2021/038318 International Search Report and Written Opinion issued on Sep. 24, 2021.
PCT/US2021/046078 International Search Report and Written Opinion issued on Nov. 24, 2021.
PCT/US2021/049171 International Search Report and Written Opinion issued on Dec. 6, 2021.
PCT/US2021/052750 International Search Report and Written Opinion issued on Dec. 28, 2021.
PCT/US2021/053048 International Search Report and Written Opinion issued on Jan. 14, 2022.
PCT/US2022/015717 International Search Report and Written Opinion issued on May 23, 2022.
PCT/US2022/013771 International Search Report and Written Opinion issued on Apr. 14, 2022.
U.S. Appl. No. 17/179,423 Final Rejection issued on Jul. 11, 2022.
U.S. Appl. No. 17/179,423 Non-Final Rejection issued on Jan. 21, 2022.
Kim et al., "Foveated AR: Dynamically-Foveated Augmented Reality Display" pp. 1-15 [online]. Jul. 12, 2019; ACM Transactions on Graphics vol. 38, Issue 4, Article 99. Retrieved from the internet <url:https://dl.acm.org/doi/10.1145/3306346.3322987>; DOI: https://doi.org/10.1145/3306346.3322987.
Taiwanese Office Action, dated Aug. 23, 2022 in a related Taiwanese patent application, No. TW 109141615.
IPRP in the related PCT application No. PCT/US2021/052750, dated Dec. 6, 2022.
Taiwanese Office Action, dated Jun. 14, 2023, in a related Taiwanese patent application, No. TW 110136602.
Japanese Office Action, dated Apr. 2, 2024 in a counterpart Japanese patent application, No. 2022-554308.
European Search Report, dated Jan. 30, 2024, in a counterpart or related EP patent application, No. EP 22750600.3.

* cited by examiner

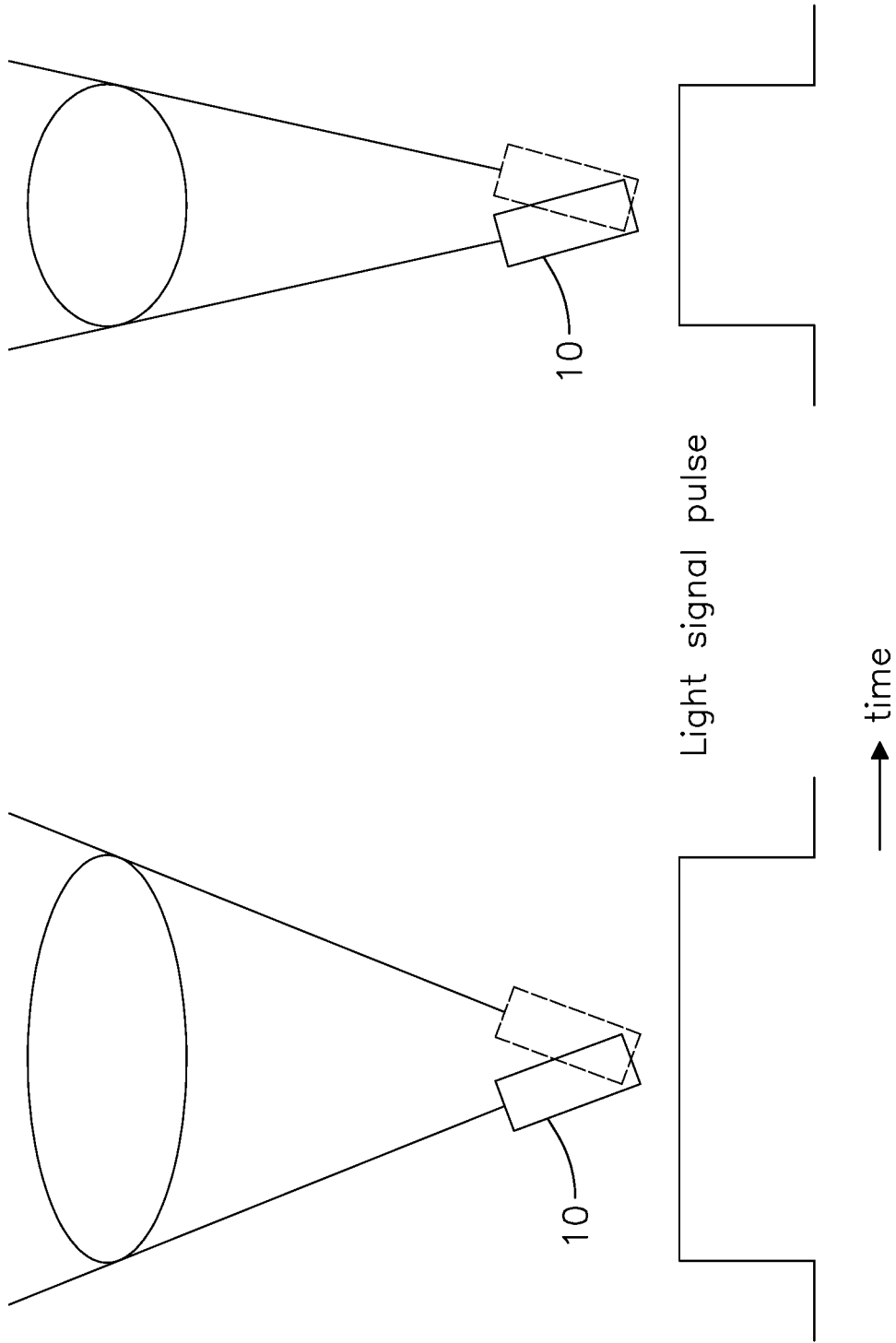

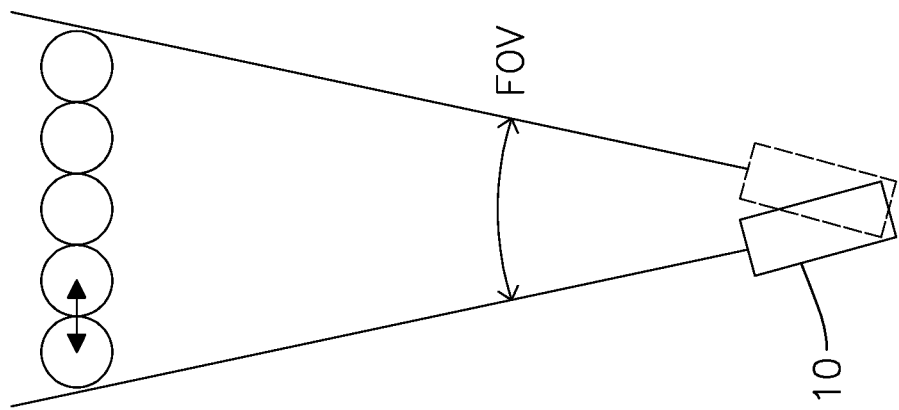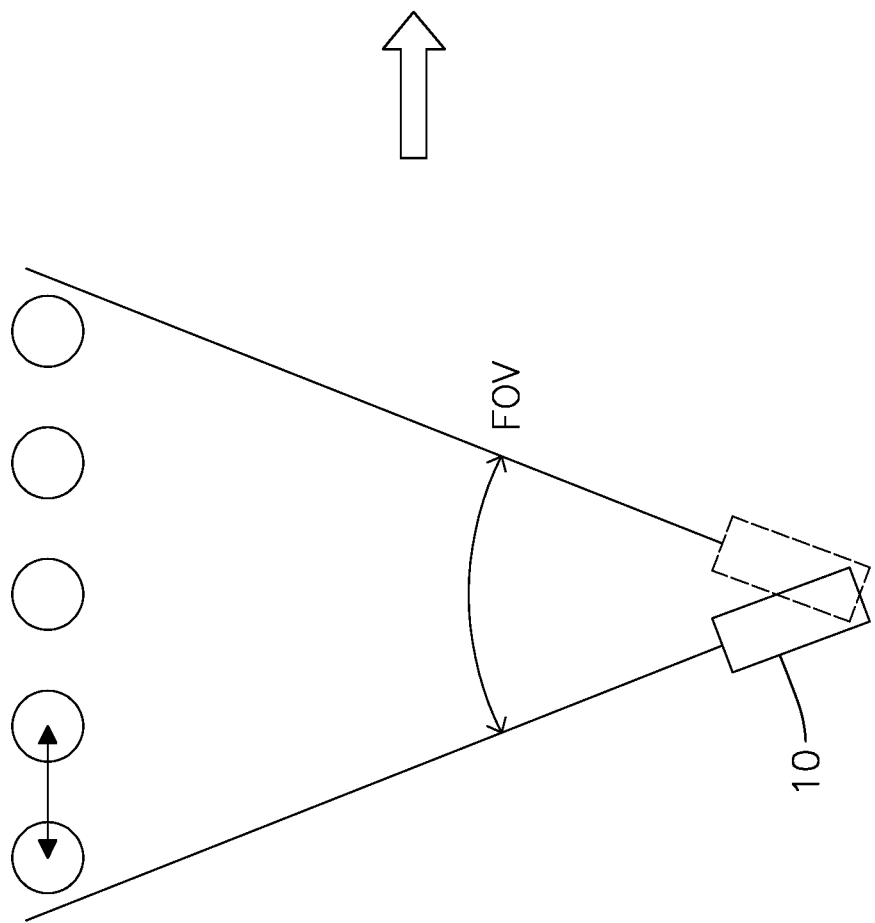
FIG. 6

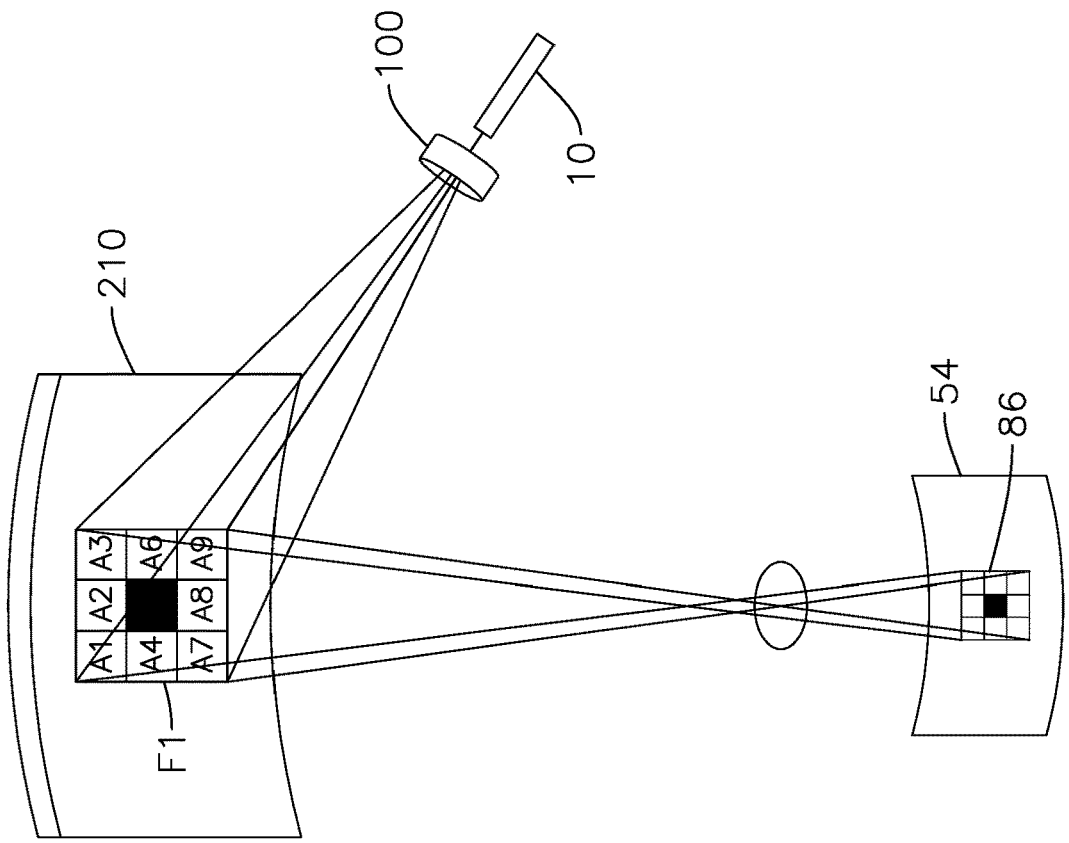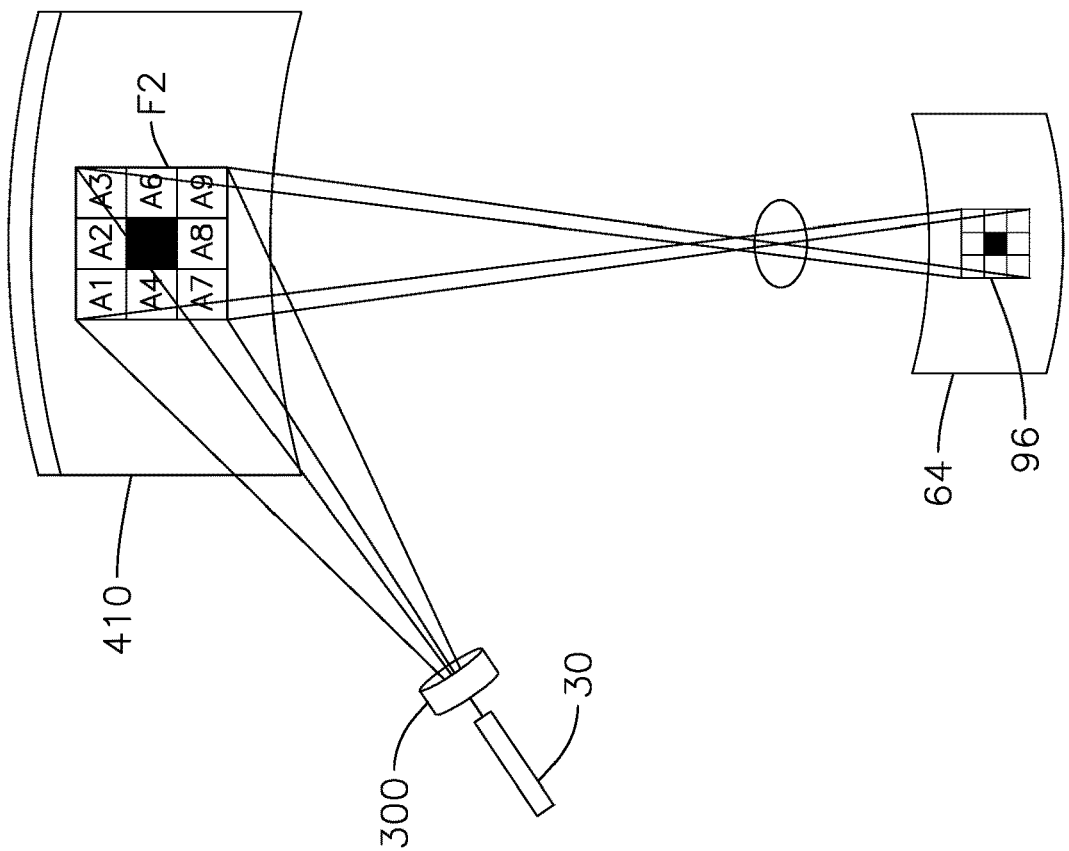
FIG.12

SYSTEM AND METHOD FOR ENHANCING VISUAL ACUITY OF HEAD WEARABLE DISPLAYS

RELATED APPLICATIONS

This application claims the priority of U.S. provisional application 63/147,214 filed on Feb. 8, 2021, titled "AR/VR SYSTEM AND METHOD FOR IMPROVING VISUAL CAPABILITY" and U.S. provisional application 63/217,297 filed on Jul. 1, 2021, titled "SYSTEM AND METHOD FOR IMPROVING VISUAL ACUITY IN AR/VR ENVIRONMENT".

In addition, PCT international application PCT/US21/52750, filed on Sep. 30, 2021, titled "VIRTUAL IMAGE DISPLAY SYSTEM FOR VIRTUAL REALITY AND AUGMENTED REALITY DEVICES", PCT international application PCT/US2020/059317 filed on Nov. 6, 2020, title "SYSTEM AND METHOD FOR DISPLAYING AN OBJECT WITH DEPTHS" are incorporated herein by reference at its entirety.

BACKGROUND OF THE INVENTION

Field of the Invention

The present invention relates to systems and methods for enhancing visual acuity; more specifically, systems and methods that may produce machine assisted vision acuity greater than 1.0 in virtual image with multiple.

Description of Related Art

Vision capability is often limited by the anatomy of human eye. Particularly, parameters such as the refractive diopter of the lens of the eye, the axial length of the eyeball, as well as the condition of the cornea and retina . . . etc. greatly affect the vision ability. There has not been machine vision provided for achieving higher than normal vision capability available to the general market. Furthermore, in recent years, machine vision has been developed and adapted to many industry segments to improve people with vision impairment. Particularly, machine vision had been applied to medical field for aiding patents with blindness or vision defect conditions such as glaucoma and myopic macular degeneration. For example, augmentation of a pixelized image can aid the patient in eyesight recovery by increasing the intensity or contrast of an object which the patient is viewing. However, this can only partially repair the vision of the patient.

Therefore, there is a need to provide a head-wearable display device/system which is convenient for daily use and may partially or substantially replace/enhance human natural vision by providing users with vision acuity beyond normal human vision.

SUMMARY

The idea of the present invention is to use light signal scanning based light emitting device on head wearable display system/devices (e.g., AR eyeglasses or VR goggle) or retinal scanning devices to aid people with visual incapability or impairment back to normal life. Particularly, the present invention is able to capture real time image information of a target object or the environment surrounding the viewer to be viewed by a viewer and reproduces a 3-dimensional digital (or pixelized) image having depth perception to the viewer. Furthermore, the present invention may replace the traditional prescription eyeglasses to perform vision correction for people having myopia or presbyopia . . . etc. The present invention can also improve eyesight exceeding normal visual capability for healthy people.

the head wearable display system comprises a target object detection module, a first light emitter, a first light direction modifier, a first collimator, and a first combiner. The target object detection module receives multiple image pixels of a first portion and a second portion of a target object. The target object may be the surrounding environment of the viewer, a portion of the surrounding environment, or an object in the surrounding environment. The first light emitter emits a multiple first-eye light signals related to the target object. For example, the multiple first-eye light signals may be direct reproduction of the image pixels of the target object such that the viewer can see the first-eye virtual image of the target object via the head wearable display system. The first light emitter may be capable of producing light pulse to create pixelized images. In some instance, the light emitter may comprise a red laser diode, a green laser diode, and a blue laser diode. The first light direction modifier received the multiple first-eye light signals emitted by the first light emitter and varies a light direction of the multiple first-eye light signals emitted from the first light emitter. The light direction may be varied with respect to time in multiple spatial dimensions such that an image is created via the cyclical scanning motion of the first light direction modifier to create an image frame within a period of time. The light direction modifier mentioned in the present invention may refer to mechanical or optical elements capable of dynamically changing the direction of light emitted by a light emitter with respect to time. The first collimator may be provided between the first light emitter and the first light direction modifier for collimating the multiple first-eye light signals from the first light emitter. In another embodiment, the first collimator may be provided between the first light direction modifier and the first combiner. Furthermore, the first collimator can change the optical path length of the first-eye light signal.

The first combiner is provided for redirecting and converging the multiple first-eye light signals towards a first eye of the viewer. In some embodiments, the first combiner receives the multiple first-eye light signals from the first light direction modifier and directs and converges the multiple first-eye light signals into a viewer's first eye. The first light direction modifier may be rotating within a range of angels or move within a range of linear displacement. The light direction of the multiple first-eye light signals is also varied within a certain range; when the first combiner receives the multiple first-eye light signals from the first light direction modifier 100, the first combiner directs the respective first-eye light signals having different incident angle into a viewer's first eye. The multiple first-eye light signals is directed into the viewer's first eye with a predetermined range of incident angles, which is equivalent to the maximum FOV produced by the head wearable display system. In some embodiments, the spot size of the first-eye light signal projected on the recital of the can be manipulated via changing the distance between the light direction modifier and the first collimator.

In one embodiment, the spot size can be adjusted by varying the projection duration of a single pixel. As a result, the spot size can be adjusted in real-time to fulfill Rayleigh criterion for different visual acuity (VA) setting. In some variation of the present embodiment, the projection duration can be affectively increased by repeatedly projecting the same pixel or image pixels in different rows or columns of pixels.

According to one embodiment of the present invention, the rate at which the light direction modifier changes direction can be modified to alter the distance between two adjacent light signals projected. In one embodiment of the present invention, the spot size of the multiple first-eye light signals can be reduced such that the little or no gaps exist between any two adjacent first-eye light signals; thereby, it is not necessary to change the swing frequency of the light direction modifier or the emission frequency of the light emitter.

In another embodiment of the present invention, only a portion of the virtual image frame is projected with higher number of light signals per unit angle (e.g. per degree) of FOA.

In some embodiments, the present invention can be implemented as a head wearable device for vision correction or vision training. The present invention can be used for correcting or improving eye disorders such as, but not limited to, myopia, hyperopia, strabismus, amblyopia, and convergence disorders.

The present invention is able to capture real time image pixels of a target object, or the environment surrounding and reproduces a 3-dimensional digital image having enhanced image quality to a viewer of the AR/VR system. The viewer of the present invention can adjust the image quality to achieve better than normal visual acuity (e.g., higher than 20/20 vision or VA 1.0). Furthermore, the present invention may help people with vision impairment or replace the traditional prescription eyeglasses to perform vision correction for people having myopia or hyperopia . . . etc. The present invention can be used by health care professionals, military personals, precision processing industry sectors, aerospace pilots, law enforcement personals, emergency and rescue personals, and athletes . . . etc.

BRIEF DESCRIPTION OF THE DRAWINGS

FIG. 5A is a schematic view explaining the effect of changing the light emitting duration on the spot size.

FIG. 5B is another schematic view explaining the effect of changing the light emitting duration on the spot size.

FIG. 6 is a schematic view explaining the effect of changing the spatial separation between adjacent light signals on FOV.

FIG. 12 is another schematic view of the display system in accordance to another embodiment of the present invention.

DETAILED DESCRIPTION OF THE PREFERRED EMBODIMENTS

Figure 1:
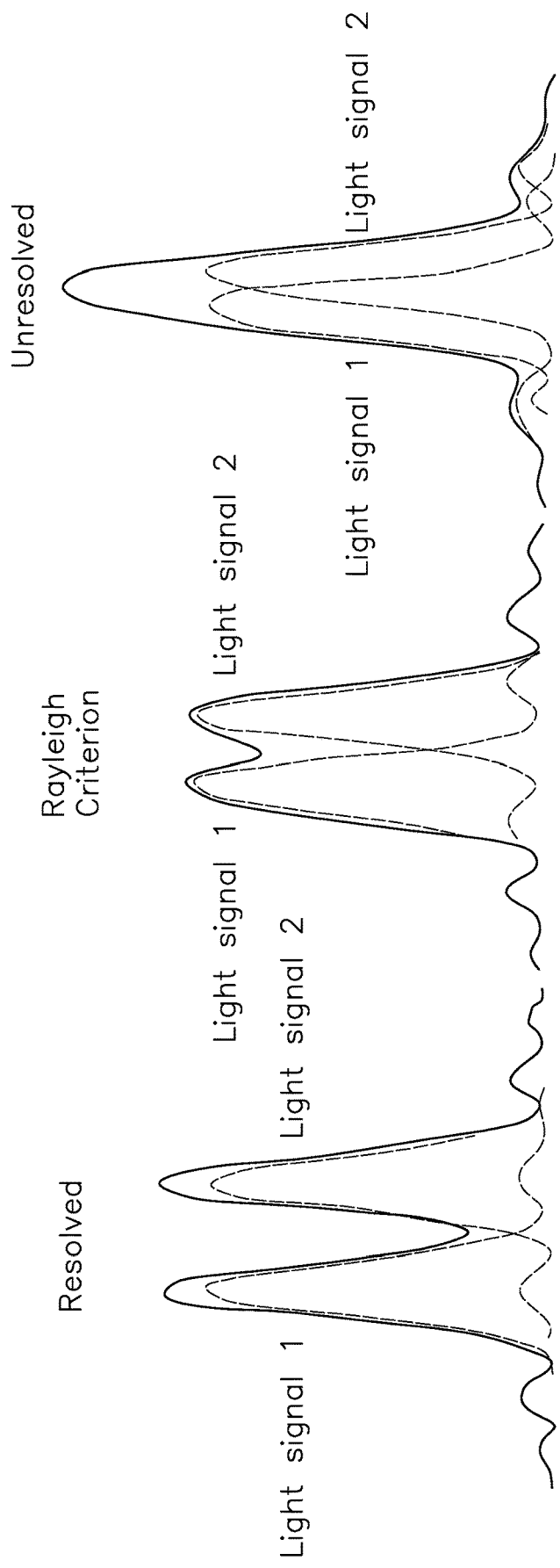
FIG. 1 is a schematic view of the Rayleigh Criterion.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

In one aspect of the present invention aims to increase human eyesight exceeding normal vision capability (super-vision) for healthy persons. In another aspect, the present invention provides improved vision for persons with visual impairment such as myopia or astigmatism, or helps training the eyes with impairment to improve vision. Yet in another aspect, the present invention can substantially replace the vision for people with blindness or other severe vision disabilities. The present invention may serve as a supplementary device to enhance human vision of the viewer; in some cases, the present invention may partially or near completely replace the function of human eyes for people having eye impairment. Furthermore, for viewers having eye impairment, the system and method of the present invention can bypass the damaged or impaired tissue of the eyes and provide clear image to the healthy portion of the viewers' retina. The present invention takes the axial length of the eyeball and the condition of the cornea and retina of the viewer into consideration and incorporates them into the design of the present invention; thereby, providing the best useability for different users. In addition, the present invention is able to provide multiple or continuous depth perception such that the viewer can perceive the highest degree of realism. The present invention is able to receive multiple image pixels of a near or distant target object and reproduce a virtual image of the target object with higher visual acuity for the viewer.

The phrase "visual acuity" relates to the number of critical gaps abled to be distinguished in an arc minute of the field of view (FOV) by the viewer. The general definition of visual acuity (VA) is given by the following formula:

visual acuity=1/gap size (in arc minute); and 1 arc minute=1/60 of a degree

For visual acuity of 1.0 (or 20/20), the eyes of the viewer need to be able to distinguish a contrast pattern (e.g., black and white pattern) within 1 arc minute of the field of view (FOV). In other words, for visual acuity of 1.0, the eyes of the viewer can distinguish 60 contrast patterns within 1 degree of the FOV. For example, if a person can only distinguish a contrast pattern within 2 arc minute of the field of view, the visual acuity is 0.5; and if a person can only distinguish a contrast pattern within 0.5 arc minute of the field of view, the visual acuity is 2. Visual acuity described in the present invention is related to a number of distinguishable/separable pixels to the retina within the range of 1 arc min, which is 1/60 degree of the FOV. In other words, to achieve better than normal visual acuity (which is VA 1.0) with a pixelized display system, the goal is to project an image of at least a portion of a target object having increased number of distinguishable pixels for the retina per degree of the field of view to the viewer; or the goal is to project an image of the target object having more than 60 distinguishable light signals/pixels for the retina per degree of the FOV. The present invention is designed to be able to generate a virtual image of at least a portion of the target object with a VA greater than 1.0 for a viewer. Thus, in some instances of the present application, the goal is to project a virtual image of the target object having more than 120 (VA 2.0) or 180 (VA 3.0) distinguishable light signals/pixels for the retina per degree of the FOV containing the at least a portion of such virtual image. That is to say, to achieve the best visual acuity possible, a display system has to project the highest possible number of distinguishable/separable pixels per degree of the FOV on the retina of the viewer's eyes. The spatial separation between two adjacent (neighboring) light signals/pixels determines whether they are distinguishable/separable on the retina. The spatial separation between two adjacent (neighboring) light signals/pixel on the retina (or other portions of the viewer's eye) may be measured by a spatial distance between centers of any two adjacent light signals/pixels on a cross-sectional plane of light path. Such spatial distance needs to meet a criteria for the two adjacent light signals to be separable. Thus, in order to project increased number of separable light signals (distinguishable pixels) for the retina within 1 arc minute range of the field of view, a spot size of the light signals/pixels on the retina need to be controlled, usually reduced, so that more separable light signals can be contained within 1 arc minute range of the field of view.

With reference to FIG. 1, regardless the distance and size of the target object intended to be reproduced in a virtual image for the viewer by the present invention, the virtual image of the target object needs to be resolved on the retina of the viewer. More specifically, the light signals (light pulse signal or light beam signal) producing the virtual image need to fulfill Rayleigh Criterion, which is known as the specification for the minimum separation between two light signals that may be resolved to be distinguishable/separable. In a pixelized display system, the light signals correspond to the pixels that produce the virtual image. For example, each light signal may comprise a pixel of the virtual image of the target object. And each light signal may have a near circular or elliptical cross-sectional area (also known as "spot size") when projected onto a cross-sectional plane of light path (e.g. the retina of the viewer's eye). According to the Rayleigh Criterion, the spatial distance/separation between the centers of the two adjacent light signals needs to be greater than half of the greatest diameter (approximately half spot size) of the adjacent light signals in order to allow the two light signals to resolve. Based upon the above reasons, although it is desirable to increase the number of light signals in a unit (e.g. per degree) of field of view to increase VA, the separation between two adjacent light signals needs to be maintained to fulfill Rayleigh Criterion in order for two adjacent light signals to be distinguishable/separable. The number of light signals per degree of the FOV alone (similar to the concept of resolution) does not necessary increase the VA for the viewer. A system also has to maintain proper spot size of the light signals and the spatial distance/separation between centers of two adjacent light signals to make them distinguishable/separable light signals.

Figure 2:
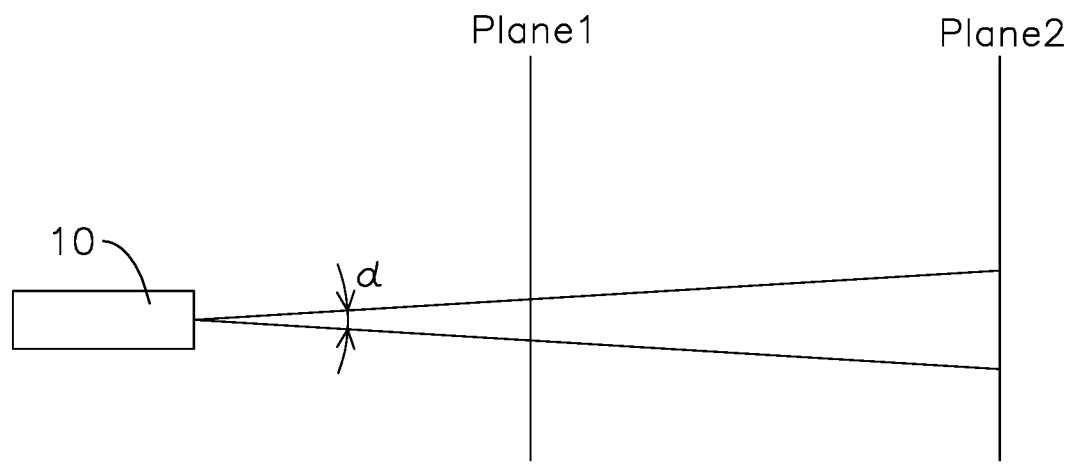
FIG. 2 is a schematic view explaining the change in spot size on different planes of projection.

The spot size of a light signal relates to a dispersion angle and a distance between the light emitter and the cross-sectional plane of light path (projection plane). With reference to FIG. 2, with constant dispersion angle α throughout the light path, the spot size projected on the projection plane increases as the distance between the light emitter and the projection plane increases (spot size on Plane 1 is smaller than spot size on Plane 2). Similarly, with a constant distance between the light emitter and the projection plane, the spot size increases as the dispersion angle increases. In the present invention, the final dispersion angle of the light signal entering the eyes and the optical length between the light emitter and the retina of the viewer can be modified with several methods, which will be described in more details below.

In order to enhance visual acuity, a pixel density needs to be increased and any two adjacent light signals need to be "resolved" (distinguishable/separabale). The pixel density is the number of light signals (e.g., pixels) projected on a unit area, proportional to a unit angle of the FOV (e.g. per degree).

In the present invention, the system and method for enhancing visual acuity is to provide an increased number of resolved and separable light signals projected in a unit angle of FOV (which is measured in degrees), so as to create a virtual image frame on the retina. In one embodiment of the present invention, the system and method for enhancing visual acuity may be implemented as a head wearable display system such as AR/VR glasses, goggle, and helmet, or other similar commercial or medical devices. In some other instances, the present invention may be applied to other stationary or non-head wearable display devices. The following uses a head wearable display system for the purpose of explaining the embodiments of the present invention; furthermore, the head wearable display system may provide pixelized virtual images to the viewer; therefore, the light signals projected by the light emitter may correspond to the pixels of the virtual images. However, the present invention is not limited to this embodiment.

Figure 3:
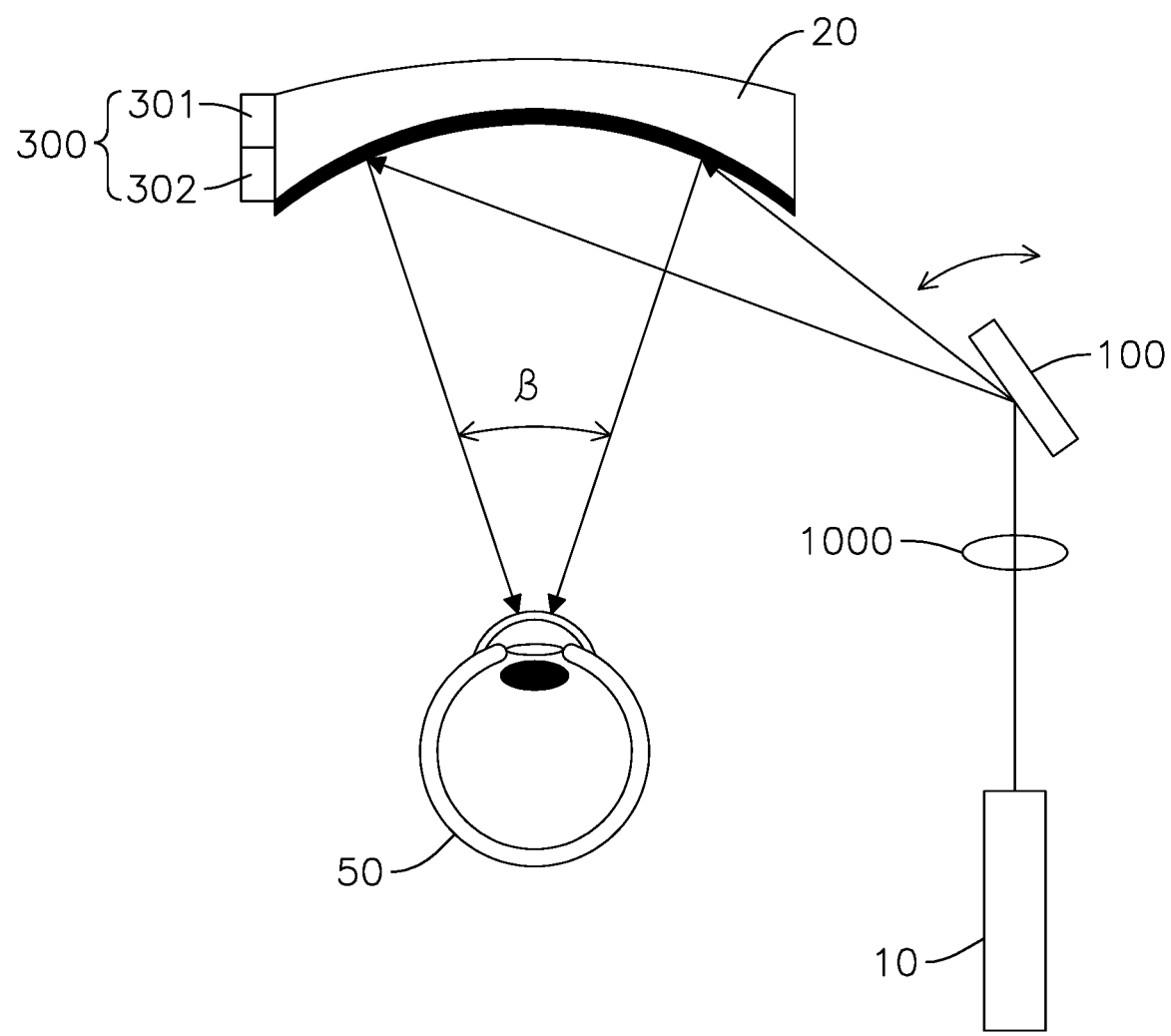
FIG. 3 is a schematic view of the display system in accordance to the first embodiment of the present invention.

With reference to FIG. 3, the head wearable display system comprises a target object detection module 300, a first light emitter 10, a first light direction modifier 100, a first collimator 1000, and a first combiner 20. The target object detection module 300 receives multiple image pixels of a first portion and a second portion of a target object. The target object may be the surrounding environment of the viewer, a portion of the surrounding environment, or a specific object in the surrounding environment. The target object detection module 300 may further comprise a distance detection unit 301 for determining a depth of the target object or at least a portion of the target object. For rendering a 3-dimensional virtual image of the target object, the target object detection module 300 may be able to measure multiple points on the target object and create a 3-dimenstional profile of the target object so a 3-dimensional virtual image of the target object may be produced later.

The target object detection modules, for receiving multiple image pixels from different view angles. Each target object detection module may be mounted to a receiving position of the frame of the head wearable display device via an attachment structure of the target object detection module and the receiving position is adjustable. In one embodiment, the target object detection module can be moved via the attachment structure to adjust the receiving position or a view angle. The attachment structure may comprise a hinge joint to adjust the view angle of the target object detection module. The target object detection module is electrically connected to the frame via the attachment structure to receive power supply or to transmit data. In some embodiments, the target object detection module can be a camera incorporated with wide-angle lens, zoom lens, fish-eye lens, or multi-purposes lens for various applications. In addition, the camera is not limited to optical camera but also includes an infrared camera for measuring temperature, a range imaging sensor (such as a time-of-flight camera etc.) for measuring depth, and other physical parameters measurement sensing module.

In some embodiment, the target object detection module is rotatable. The target object detection modules may include a first target object detection module and a second imaging module. In this embodiment, the target object detection module capture user's or environmental images and processes to recognize the images.

The first light emitter 10 emits multiple first-eye light signals related to the target object. For example, the multiple first-eye light signals may generate a first-eye virtual image of the first portion and the second portion of the target object for the viewer via the head wearable display system. The first light emitter 10 may be capable of producing light pulses to create pixelized virtual images. For instance, the first light emitter 10 may be a laser emitter capable of emitting a light signal or pixel at a time. As an example, the light emitter may comprise a red laser diode, a green laser diode, and a blue laser diode. The first light direction modifier 100 receives the multiple first-eye light signals emitted by the first light emitter 10 and varies a light direction of these multiple first-eye light signals. The light direction may be varied with respect to time in multiple spatial dimensions such that an image is created via the cyclical scanning motion of the first light direction modifier 100 to create an image frame within a period of time. The light direction modifier in the present invention may refer to mechanical or optical elements capable of dynamically changing the direction of light emitted by a light emitter with respect to time. An example of which may be, but not limited to, 1-dimensional, 2-dimensional, and 3-dimensional micro-electromechanical systems (MEMS) mirrors. The first collimator 1000 may be provided between the first light emitter 10 and the first light direction modifier 100 for collimating the multiple first-eye light signals from the first light emitter 10. In another embodiment, the first collimator 1000 may be provided between the first light direction modifier 100 and the first combiner 20. Furthermore, the first collimator 1000 may adjust a beam waist location of each of the multiple first-eye light signals so that the multiple first-eye light signals are separable from each other.

The first combiner 20 is provided for redirecting and converging the multiple first-eye light signals towards a first eye of the viewer. The first eye may be a right eye or a left eye of the viewer. In some embodiments, the first combiner 20 receives the multiple first-eye light signals from the first light direction modifier 100 and redirects and converges the multiple first-eye light signals into a viewer's first eye 50. More specifically, as an example, the first light direction modifier 100 may be rotating within a range of angels or move within a range of linear displacement. As a result, the light direction of the multiple first-eye light signals is also varied within a certain range; when the first combiner 20 receives the multiple first-eye light signals (each of which having different incident angle) from the first light direction modifier 100, the first combiner 20 redirects the respective first-eye light signals having different incident angle into a viewer's first eye 50. Since the rotation or linear displacement of the first light direction modifier 100 is predetermined, as a result, the multiple first-eye light signals is redirected into the viewer's first eye 50 with a predetermined range of incident angles, which is equivalent to the maximum FOV produced by the head wearable display system.

In some embodiments of the present invention, the head wearable display system may have a dual-axes design for the combiner so that the pitch and roll (rotational angle along the horizontal direction and vertical direction) of the combiner can be adjusted. Furthermore, the X, Y, and Z position of the combiner may also be adjusted so as to fit the interpupillary distance of individual viewers. In some other embodiments, the X, Y, and Z position of the combiner can also be adjusted for individual viewers.

Figure 4A:
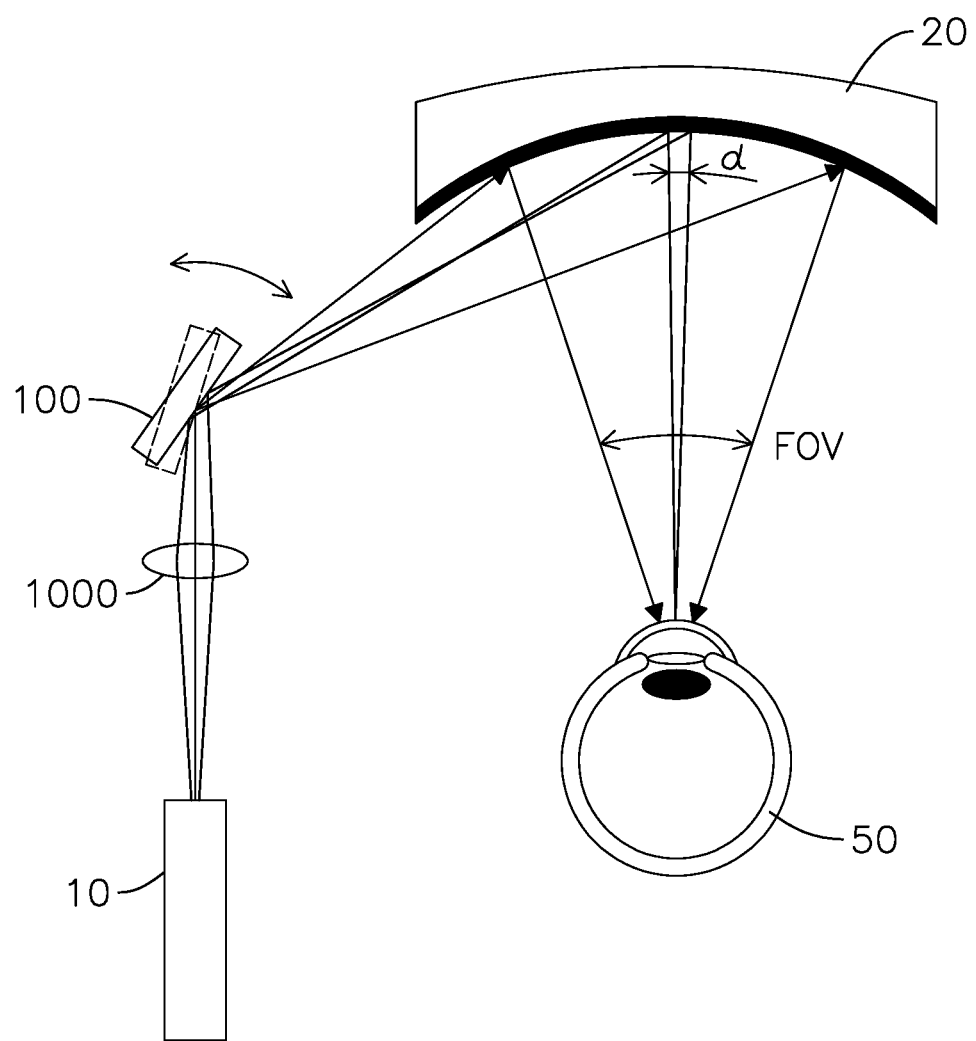
FIG. 4A is a schematic view explaining the effect of changing the location of the collimator.
Figure 4B:
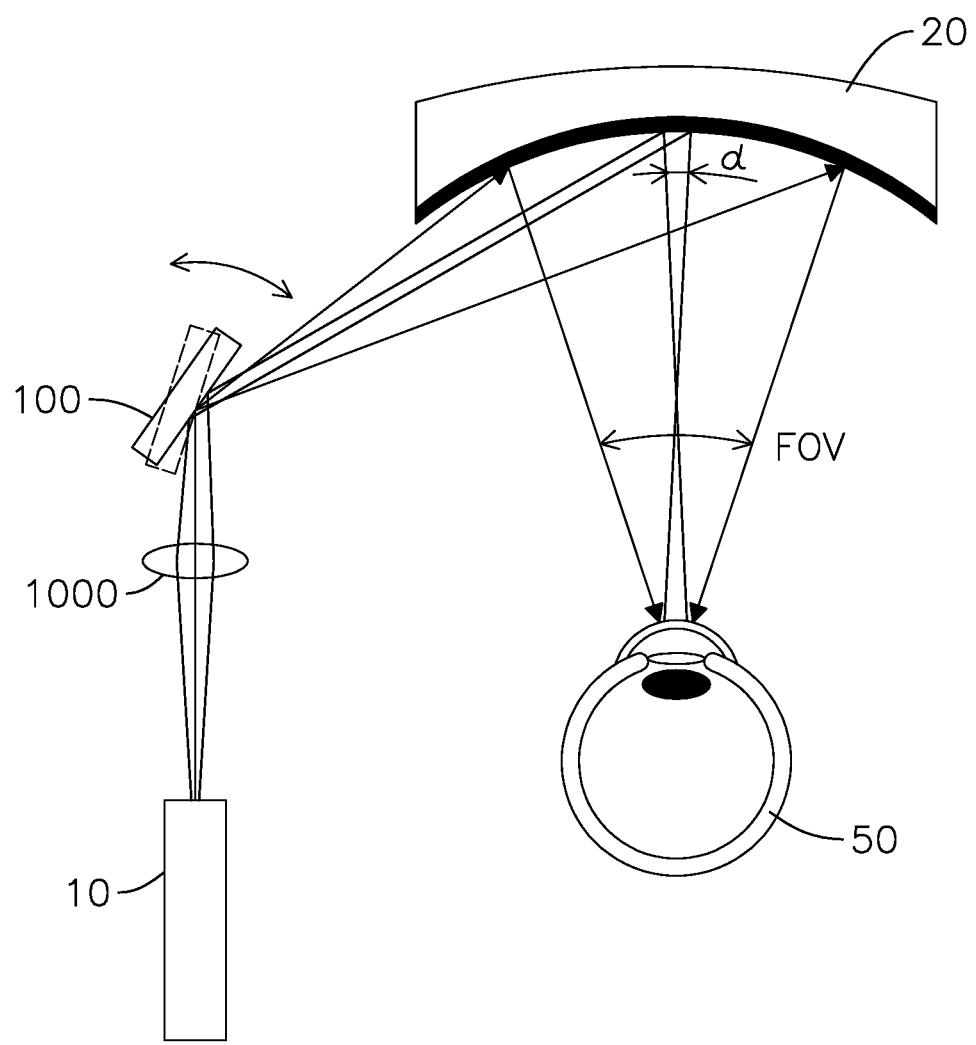
FIG. 4B is another schematic view explaining the effect of changing the location of the collimator.

With reference to FIGS. 4A-4B, the dispersion angles a of each of the first-eye light signals traveling from the first combiner 20 to the first eye 50 determine spot sizes of the light signals rendered on the retina of the viewer. The spot size increases as the dispersion angle increases, and vice versa. According to one embodiment, the spot size of the first-eye light signal projected on the retina may be modified by changing the distance between the first light direction modifier 100 and the first collimator 1000. With reference to FIGS. 4A-4B, the figures explain how changing the distance between the first light direction modifier 100 and the first collimator 1000 affects the spot size. The light beams in the figures represent the optical path of a single first-eye light signal projected by the first light emitter 10. Throughout the optical path (light path) of the first-eye light signal traveling from the first light emitter 10 to the first eye 50 of the viewer, the light beam of the first-eye light signal undergoes several diverging/converging cycles. The cross-sectional area of the light beam (which is equivalent to the spot size) varies along different location of the optical path. In other words, the spot size is different at different locations of the optical path. By changing the total optical path between the light emitter and the eyes of the viewer, the cross-sectional area projected onto the retina of the viewer is varied, thereby, changing the spot size. It is apparent that the spot size perceived by the viewer's eye may also depend on the specification of the eye of each individual viewer, such as the total dioptric power of the eyes, the axial length, and the condition of retina . . . etc. These factors needs to be taken into consideration when an initial calibration is performed for different users/viewers. In both FIGS. 4A and 4B, the first-eye light signal converges gradually after emerging from the first combiner 20 but form beam waist (where the cross-sectional area of the beam is minimum) at different locations. In FIG. 4A, the light signal diverges after leaving the beam waist prior to incident on the first combiner 20. The light signal converges again after being reflected by the first combiner 20 prior to entering the first eye 50 of the viewer. In FIG. 4B, the beam waist is formed between the first combiner 20 and the first eye 50 of the viewer. As a result, the spot size of the first-eye light signals provided to the viewer's first eye 50 in these two figures are different. In this embodiment, the location of the beam waist can be adjusted by changing the location of the first collimator 1000, so that the spot size of the multiple first-eye light signals projected on the viewer's first eye 50 (e.g., the retina) is adjusted such that the multiple first-eye light signals are separable and resolved according to Rayleigh Criterion. In some other instances, the location of the beam waist (thereby, the spot size) can be adjusted by changing the distance between the first light direction modifier 100 and the first collimator 1000. Evidently, by manipulating the distance between the first light direction modifier 100 and the first collimator 1000, most suitable spot size and beam separation may be evaluated and determined for viewers having different eye conditions. In general, the curvature of the collimator and the combiner may be customized for different users as these parameters may also affect the spot size. Furthermore, since the spot size of the in these two figures are different, whether the spatial distance/separation between the centers of two adjacent first-eye light signals meets the Rayleigh Criterion may be changed.

The following describes several methods for modifying the number of multiple first-eye light signals per degree in the FOV of the viewer to change the VA perceived by the viewer. These methods involve modifying the spot size of the light signals, as well as the spatial separation between adjacent light signals.

With reference to FIGS. 5A and 5B, in one embodiment, the spot size can be adjusted by varying the projection duration of a single pixel (e.g., via means of control software). The light emitter produces an image frame by projecting one light signal/pixel of the image at a time; the light emitter (fixed), via the motion of the light direction modifier (not shown), then alters the location of projection to produce another pixel of image at a new location. Therefore, if the projection duration of the light signal is decreased, the width of the pixel in the direction of rotating of the light direction modifier will decrease; if the projection duration of the light signal is increased, the width of the pixel in the direction of rotating of the light direction modifier will increase. As a result, the spot size can be adjusted in real-time to fulfill Rayleigh criterion for different VA setting. In some variation of the present embodiment, the projection duration can be affectively increased by repeatedly projecting the same pixel or image pixels in different rows or columns of pixels. In FIG. 5A, the light emission pulse has a longer projection duration relative to that of FIG. 5B. With the same swing frequency of the light direction modifier between FIGS. 5A and 5B, longer projection duration allows the light signal to sweep across a greater area, which result in larger spot size for the light signal.

Considering that changing the spot size will also change the gap between each of the light signals, therefore there is a need to cope with the increasing or decreasing distance between each of the light signals. The following describes different embodiments for changing the gap between each of the light signals.

According to one embodiment of the present invention, the rate at which the light direction modifier changes direction (i.e., swing frequency) can be modified to alter the distance between each of the light signals projected. As mentioned earlier, the light direction modifier in the present invention may be able to change the direction of light in one axis or two separate axes (e.g., 2-dimensional MEMS mirror). As an example, a 2-dimensional MEMS mirror may be able to deflect light signal to optical scanning angles of up to approximately 30° at high speeds in both axes. However, the maximum scanning angle in one axis may be larger (main scanning axis) than the other (sub scanning axis). The swing frequency or swing amplitude of the MEMS mirror may be controlled by respectively applying different frequency of driving voltage/electromagnetic field and different amplitude of driving voltage/electromagnetic field to the MEMS mirror, which is readily well known in the art. According to this embodiment, the first light direction modifier 100 varies the first coordinate component or the second coordinate component of the multiple first-eye light signals with non-constant swing frequency (or swing rate, which is how fast the light direction modifier rotates or moves with respect to a reference). The first coordinate component or the second coordinate component may be the x coordinate component or the y coordinate component in the Cartesian coordinate system, or θ coordinate component and φ coordinate component in the polar coordinate system. When the present invention displays an image with higher VA setting, the spot size of the light signal may be decreased. The swing rate of the first light direction modifier 100 can be decreased such that each of the adjacent light signals can be projected at smaller angular displacement, which in turns causes the light signals projected on the retinal of the viewer to be closer (with reference to FIG. 6). As a result, the number of light signals projected per unit angel (e.g. per degree) of FOA increases, causing the VA perceived by the viewer to increase. The swing angle of the light direction modifier is constant, consequently, a virtual image frame having the same frame size but with larger light signal density is produced.

As shown in FIG. 6, to cope with decreased in the swing frequency while maintaining the same frame rate for image projection, the scanning area of the light direction modifier can be reduced. This in turns causes the FOV to be reduced after the spatial separation between the center of each of the light signals projected is reduced. However, reduce in FOV can actually enhance VA.

Figure 7:
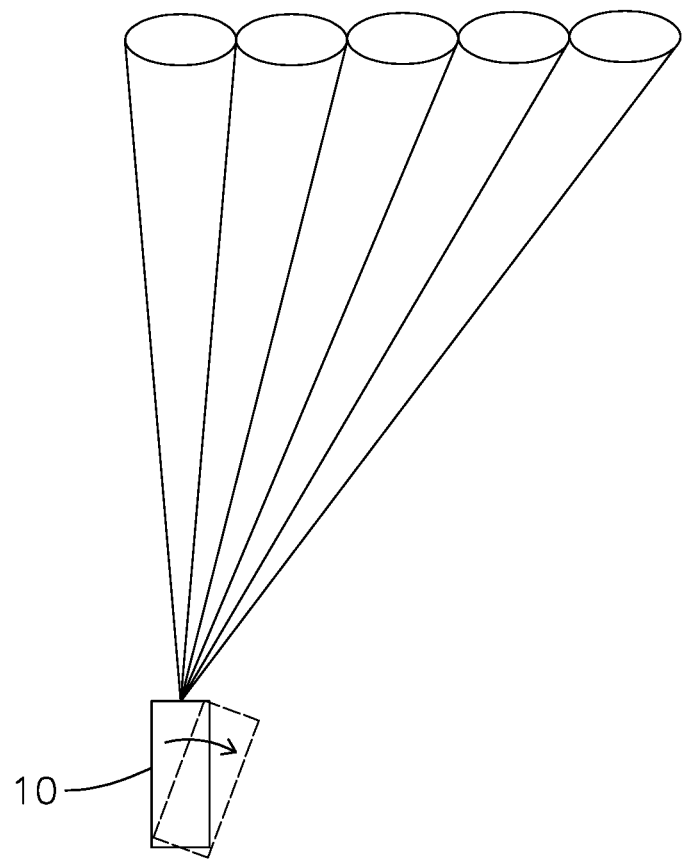
FIG. 7 is a schematic view explaining one embodiment of changing the spatial separation between adjacent light signals.

As shown FIG. 7, in one embodiment of the present invention, the spot size of the multiple first-eye light signals can be modified such that the little or no gaps exist between any two adjacent first-eye light signals. When the light signals are projected onto a cross-sectional plane of light path a spot area is created. The spot area of each of two adjacent light signals on the cross-sectional plane of light path approximately adjoins each other, as shown in FIG. 7. Thereby, it is not necessary to change the swing frequency of the light direction modifier or the emission frequency of the light emitter. However, in this embodiment, the maximum VA may be limited because the minimum spot size is limited.

In order to maintain sufficient frame rate, in another embodiment of the present invention, only a portion of the virtual image frame is projected with higher number of light signals per unit angle (e.g. per degree) of the FOA (which is higher VA). The idea behind the present embodiment is when human eye views an target object, the visual axis of the eye is directed to the target object, causing the image of the target object being concentrated on the macula of the eye (which is the most sensitive part of the retina); and thus, the target object appears to be in the central FOV of the vision. Relative to the target object in the image, other portions of the image may become less clear since these portions of the image may be projected to other parts of the retina that are less sensitive to the light. Based upon the nature of human vision described above, the present embodiment provides a central FOV (or first FOV) representing the first portion (which is the center portion) of a frame of the virtual image of the target object with a higher number of light signal per degree of FOV relative to the peripheral FOV (or second FOV) representing the second portion (which is the peripheral portion) of the frame of the virtual image of the target object, so the user of the present invention can see the central FOV of the target object with higher pixel density (higher visual acuity); whereas the image in the peripheral FOV of the target object does not need to be as clear as the central FOV since the human eye would not be able to perceive higher quality image in the peripheral FOV anyway. In other words, the first portion of the target object in the first FOV has a greater number of the multiple first-eye light signals per degree than that of the virtual image of the second portion of the target object in the second FOV. In one embodiment, the number of light signals (or pixels) projected in the central FOV can be manipulated by varying the swing frequency of light direction modifier when the first light emitter 10 is projecting light signals for the central FOV. In addition to varying the swing frequency, the number of light signals (or pixels) projected in the central FOV can be further varied by modifying the projection frequency or the projection duration of the light signals, as mentioned earlier. By implementing these methods, the time it takes for the light emitter to produce a frame (frame rate) can be kept at a higher rate. The resulting virtual image created by this method will have non-uniform pixel density.

Figure 8:
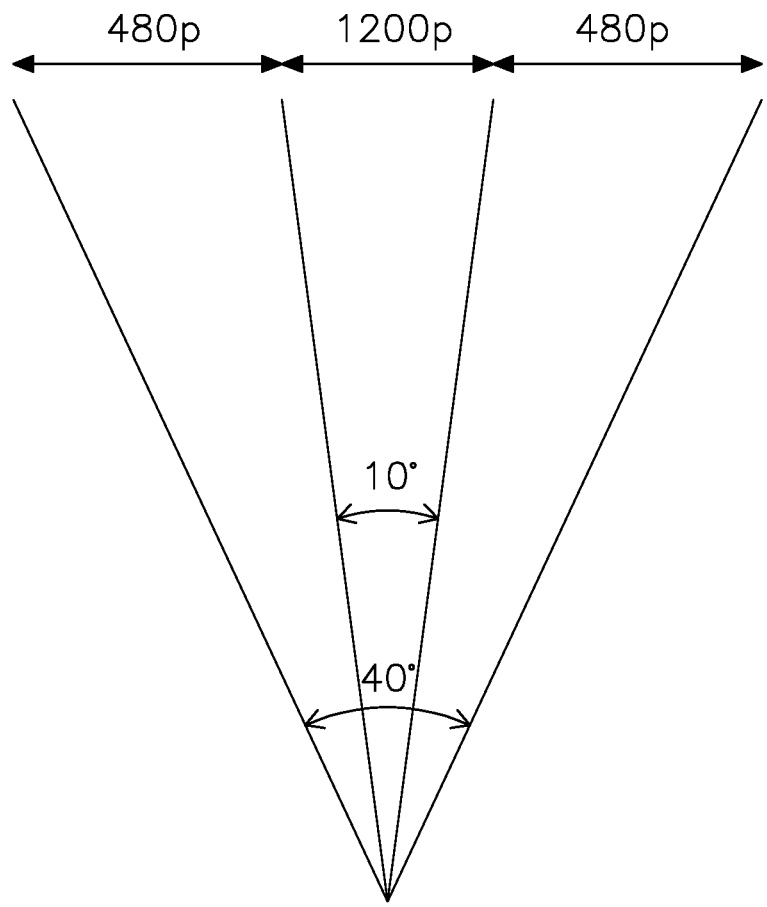
FIG. 8 is a schematic explaining one embodiment of changing the swing frequency of the light direction modifier to change the VA.

As an example, under normal condition (when the swing frequency is at the default value), the first light emitter 10 and the first light direction modifier 100 may be capable of forming an image frame consisted of a default resolution (e.g., 1280×720 pixels) within a first spatial range (e.g., 40 degrees in the horizontal or 22.5 degrees in the vertical direction). The spatial range mentioned in the present discloser represent a range of in both first coordinate component and the second coordinate component, which may be expressed with two coordinates. In the present embodiment, the first spatial range correspond to the FOV of the first eye 50. The first image frame is divided into a two FOVs, which is the peripheral FOV and a central FOV. The central FOV of the image frame will be provided with higher number of light signals in per unit angle (e.g. per degree) of FOV (high light signal/pixel density projected on the retina) relative to the peripheral FOV. As an example, the central FOV in both coordinate components may be set as 10 degrees of the total FOV in both coordinate components; the peripheral FOV on both sides may be set to be 15 degrees of the total FOV. When the viewer choose a higher VA setting, the spot size of the light signals in the central FOV may be decreased; meanwhile, the swing rate of the light direction modifier may be decreased in response to compensate for the increasing gap between each of the light signals. The light signals within the peripheral FOV can be produced with the default spot size with default swing frequency of the light direction modifier. As a result, the viewer can perceive a higher in the central FOV than the peripheral FOV in an image frame F1 is not uniform. With reference to FIG. 8, the following demonstrates one specific example for varying the pixel density in one coordinate component (e.g., horizontal direction or vertical direction). In this example, the total FOV in the one direction may be 40 degrees; the central FOV is may be set to be 10 degrees of the central FOV, and the default total resolution to be displayed per frame is 1280×720. If the target VA is 2.0, then the total number of pixels required for VA=2.0 in the central FOV is:

60×2×10=1200 pixels (where 60 is the number of
pixels per degree of FOV required for VA=1.0)

For the rest of the FOV (peripheral FOV), the density of pixels remains the same as original. The total number of pixels in said direction in the peripheral FOV is:

1280×30/40=960 pixels

VA=960/30/60=0.53

During the formation of the first image frame, the first light direction modifier 100 continuously rotates and changes the projection direction of the first light emitter 10 to produce the first image frame in a row-by-row or column-by-column manner. Particularly, the first light emitter 10 produces the first image frame by projecting one pixel of image at a time; the first light direction modifier 100 then alters the direction of the first-eye light signals 1000 to produce another pixel of image at a new location. The new location is oftentimes horizontally or vertically right next to the previous pixel of image. Therefore, after a period of time, the first light emitter 10 produces a row of pixel images or a column of pixel images (e.g., 1280×1 or 1×720). The first light direction modifier 100 then changes the direction of the first-eye light signals 1000 to the next row or column and continues to produce a second row or a second column of pixel images. This process is repeated until a complete image frame is produced (e.g., completing 1280×720 pixel images).

In some embodiments, with constant light projection frequency of the light emitter, the swing frequency of the light direction modifier can be decreased to increase pixel density (by reducing the spatial separation between the adjacent pixels) in the sub-scan direction of the light direction modifier. For increasing the pixel density in the main scan direction, the light projection frequency of the light emitter can be increased. As an example, the swing frequency of the light direction modifier can be decreased by ½ to increase the number of pixels in the sub-scan direction from 720 p to 1440 p. The light projection frequency can be increased by 2 times to increase the number of pixels in the main scan direction from 720 p to 1440 p.

In other instances, it may be beneficial to implement two one-dimensional light direction modifiers so that the swing frequency of the light direction modifier in both the horizontal direction and vertical direction can be varied according to different region of FOV. As mentioned earlier, the swing frequency of the light direction modifier in the horizontal direction and vertical direction are varied in accordance with the horizontal and vertical positions. While projecting image in the central FOV, the projection rate can be increased and/or the swing frequency of the light direction modifier in both the horizontal and vertical directions can be decreased such that a higher density of pixels or image pixels can be projected in the central FOV (which in turn increases VA in the central FOV). The rate of projection and/or the swing frequency of the light direction modifier in both directions can resume to normal in the peripheral FOV.

In a variation of the embodiments mentioned above, the image in the central FOV may be produced with higher VA, while light emitter does not emit any light signal associated with in the peripheral VA. Particularly, in a AR head wearable display system, only a portion of the target object (e.g., a target in a farther distance) may be selected by the viewer to display with higher VA; the other portion of the target object may be viewed by the viewer with natural vision. Therefore, only a small portion of the total FOV needs to be displayed with higher number of light signals per degree within FOV, and the remaining FOV are displayed with 0 light signals per FOV. The frame rate may be maintained at a relatively higher since the smaller FOV needs to be scanned by the light direction modifier.

As mentioned earlier, in order to achieve visual acuity exceeding normal human vision, the number of resolved light signal per FOV projected on the viewer's retina need to be increased. In order to achieve this, the following factors are considered by the present invention: the spot size of the light signals projected on the retina of the viewer; the size of the FOV perceived by the viewer, and the spatial separation between each of the light signals. In one embodiment of the present invention, the spot size relates to the size of each of the pixels projected on the retina. If the spot size is too large, or the spatial separations between the adjacent pixels (e.g., the spatial separation between the centers of the adjacent pixels or the spatial separation between the edge of the adjacent pixels) are too small, the pixels may overlap with each other and can cause pixels or images to be unresolved; on the other hand, if the spot size is too small or the gap between each of the pixels is too large, the total number of pixels that can be packed within an unit angle of FOV (or in turn, an area of the retina) is decreased. In both cases, the VA is degraded. As examples, the following table illustrates the relationship between VA and the key factors mentioned above. A laser projector is used as a light emitter in this example. The resolution of the laser projector in the present invention is typically 1280×720 or 1920×1080 pixels. However, the resolution of the light emitter is not limited to these values. The data shown in the table below are based on experimental results.

target object detection module 300 determines a distance or corresponding depths of at least a portion of the target object. For better understanding the present application, suppose there are two objects having the same physicals size in a surrounding environment of the viewer, when both viewed by the viewer, the one farther (larger depth) to the viewer occupies a smaller portion of the total FOV relative to the one closer (smaller depth) to the viewer. For the viewer to see the object farther to the viewer with the same amount of details as the object closer to the viewer, the object farther to the viewer need to be displayed with higher VA (e.g., exceeding VA 1.0). Consequently, as discussed earlier, for rendering the virtual image of different portions of the target object having different depths, the dispersion angle of each of the multiple light signals and a spatial separation between centers of any two adjacent light signals rending the images of the objects need to be modified according to the depth variation. Furthermore, the target object mentioned herein may refer to the surrounding environment of the viewer or individual objects in the surround-

TABLE 1

VA (or Angular Resolution) v.s. FOV and Spot size

| Resolution of Laser Projector | Visual Acuity | Pixels or lines/degree required | FOV to meet lines/degree (VA) requirement | Lens pair to shrink FOV | Minimum spot size to meet Rayleigh Criterion Unit: um (Ideal~Max.) |
|---|---|---|---|---|---|
| 1280 × 720p | 0.53 (1280/2400) | 0.53*60 = 31.8 | 1280/31.8 = 40 degrees | F50/F50 mm | 13.96~20.94 um |
| 1280 × 720p | 1 | 60 | 21.33 | F50/F100 mm | 6.98~10.47 um |
| 1280 × 720p | 1.5 | 90 | 14.22 | F25/F100 mm | 4.65~6.98 um |
| 1280 × 720p | 2 | 120 | 10.67 | F25/F100 mm | 3.49~5.25 um |
| 1280 × 720p | 2.5 | 150 | 8.53 | F20/F100 mm | 2.79~4.19 um |
| 1280 × 720p | 3 | 180 | 7.11 | F16.67/F100 mm | 2.33~3.49 um |
| 1280 × 720p | 4 | 240 | 5.33 | F12.5/F100 mm | 1.75~2.62 um |
| 1920 × 1080p | 2 | 120 | 16.00 | NA | 3.49~5.25 um |
| 1920 × 1080p | 4 | 240 | 8.00 | NA | 1.75~2.62 um |

According to the table above, in order to achieve VA of 1, the required number of resolved (fulfilling Rayleigh Criterion) pixels within one degree of field of view is 60. When a laser projector capable of producing resolution of 1280×720 p is used, to create VA of 2.0, the number of pixels needed to be resolved within FOV of 10.67 degrees is 120. For VA of 3.0, 180 pixels need to be resolved within FOV of 7.1 degrees. For VA of 4.0, 240 pixels need to be resolved within FOV of 5.33 degrees. If a laser projector capable of producing resolution of 1920×1080 p is used, to create VA of 2.0, 120 pixels need to be resolved within FOV of 16 degrees. For VA of 4.0, 240 pixels need to be resolved within FOV of 8 degrees.

Furthermore, in order to achieve VA exceeding normal vision, the appropriate curvature (thereby, the focal length) of the combiner need to be selected to suite different users. Once it is selected, for the viewers to be able to experience the desired VA setting, the distance between the light direction modifier and the collimator can be adjusted so as to project light signals with the proper spot size.

The following describe an exemplary implementation of the present invention. A head wearable display system may be used as a vision aid by a viewer to obtained vision capability higher than normal human vision (e.g., higher than VA 1.0). The target object detection module 300 captures multiple image pixels of the target object. The image pixels may be related to a portion of the target object or the entire target object in depending on the physical size of the target object. Since each portion of the target object may have variable position and depth relative to the viewer, the ing environment. If the target object occupies a relatively large portion of the total FOV of the viewer, the virtual image of the target object may be divided into multiple FOVs. Depending on the depths of different portion of the target object, a number of the multiple first-eye light signals per degree in a first field of view containing the first portion of the target object may exceed a number of the multiple first-eye light signals per degree in a second field of view containing the second portion of the target object. In this embodiment, the first field of view and the second field of view may respectively represent different portion of the target object.

In variation of the previously mentioned embodiment, when the target object is moving relative to the viewer, the target object detection module 300 captures the image pixels of the moving target object. The distance detection unit 301 of the target object detection module 300 dynamically determines a distance or a depth of the moving target object in the surrounding. The FOV of the virtual image of the moving target object varies according to the position of the moving target object. The dispersion angle of each of the multiple light signals and a spatial separation between centers of any two adjacent light signals rending the images of the moving target object need to be modified according to the depth of the object to compensate for the change of FOV. As a result, a number of the multiple first-eye light signals per degree in a first field of view of the target object (e.g., when the target object is farther away) may exceed a number of the multiple first-eye light signals per degree in a second field of view of the target object (e.g., when the target object is closer). In this embodiment, the first field of view and the second field of view may respectively represent different virtual image at different time of the moving target object.

Another aspect of the present invention is the ability to produce images of a portion of the target object or a target object having high VA (higher than VA 1.0) with depth perception.

Figure 9:
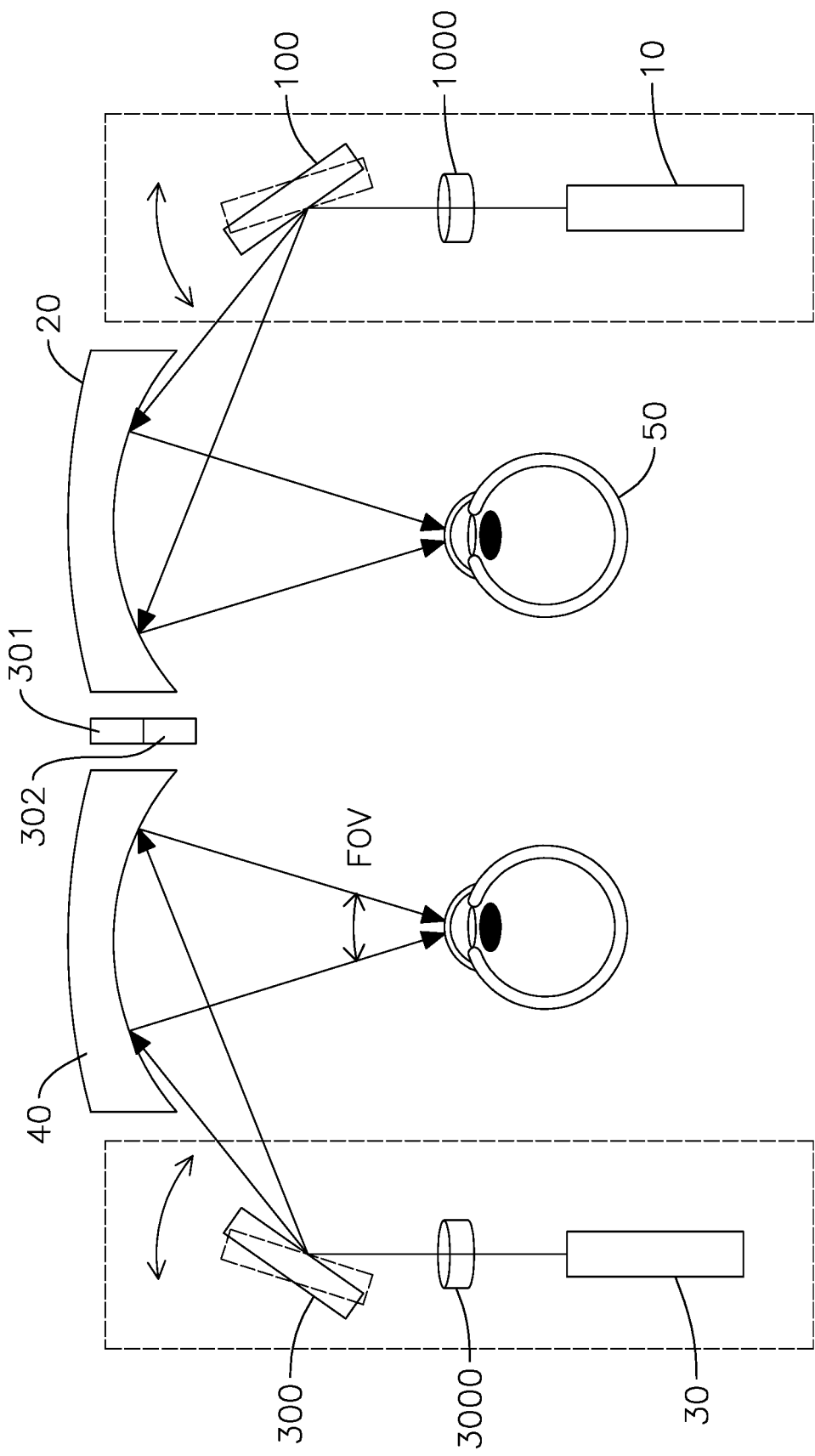
FIG. 9 is a schematic view of the display system in accordance to another embodiment of the present invention.
Figure 10:
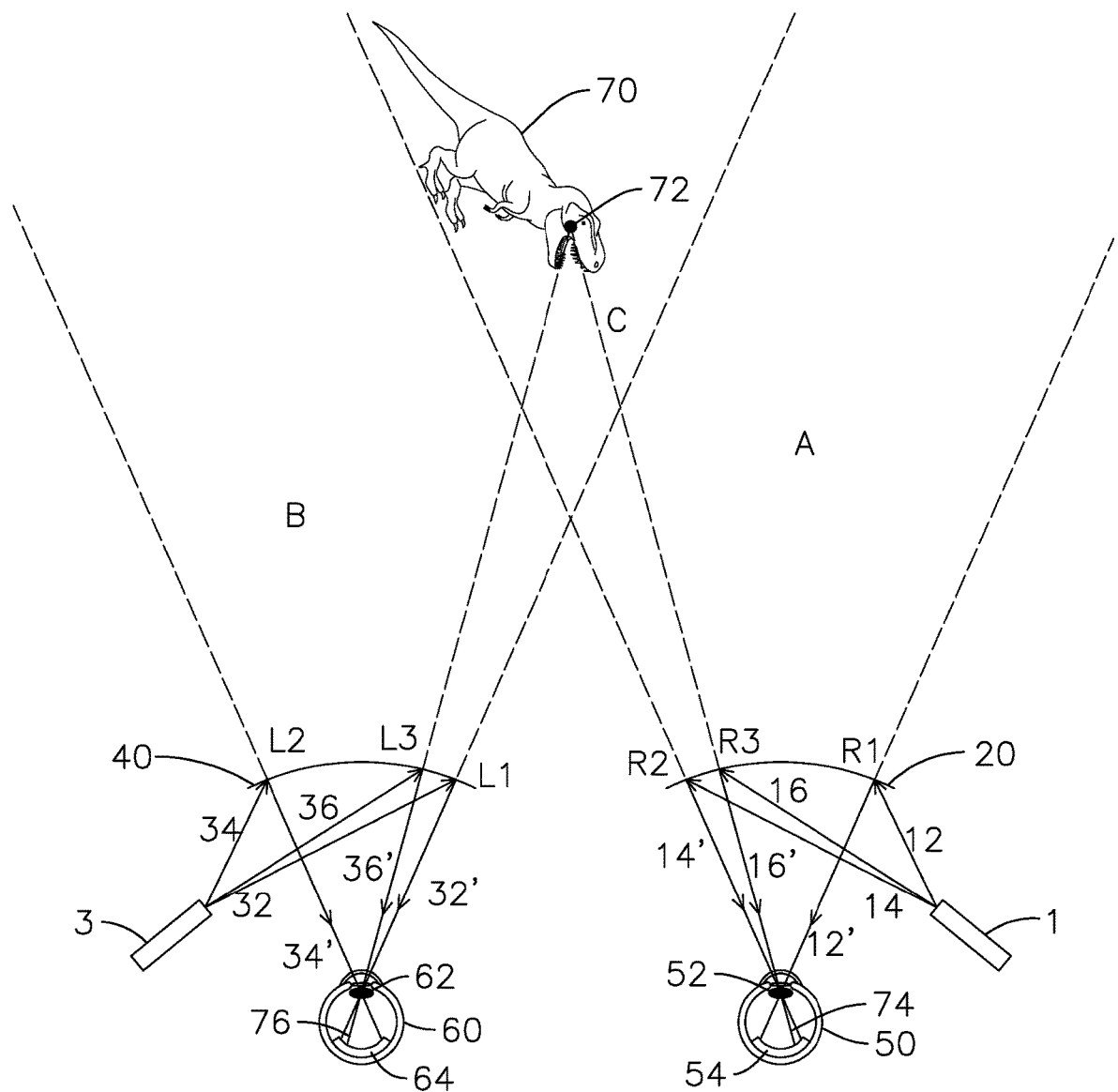
FIG. 10 is another schematic view of the display system in accordance to another embodiment of the present invention.

With reference to FIG. 9, in some embodiments, the present invention comprises a first light project 1, which comprises a first light projector 1, a first light direction modifier 100, a first collimator 1000; and a first combiner 20. In addition, the present invention further comprises a second light project 3, which comprises: a second light projector 3 emitting a multiple second-eye light signals corresponding to the multiple first-eye light signals to display the second-eye virtual image of the target object; a second collimator 3000 for adjusting a beam waist location of each of the multiple second-eye light signals so that the multiple second-eye light signals are separable from each other; a second light direction modifier 300 varying a light direction of each of the multiple second-eye light signals emitted from the second light projector 3. The present invention further comprises a second combiner 40, for redirecting and converging the multiple second-eye light signals towards the second eye 60 of the viewer. The second light projector 3, the second collimator 3000, the second light direction modifier 300, and the second combiner 40 are similar in functions as their counterparts. As an example, the multiple second-eye light signals are provided to the left eye of the viewer and the multiple first-eye light signals are provided to the right eye of the viewer (or vice versa). Each of the multiple second-eye light signals has a corresponding first-eye light signal; namely, a first-eye light signal and the corresponding second-eye light signal fused together to create a virtual binocular pixel of the binocular virtual image. Each of the first-eye light signals and each of the second-eye light signals has a respective incident angle entering the first eye 50 and the second eye 60. Furthermore, the second light projector 3, the second collimator 3000, the second light direction modifier 300, and the second combiner 40 may change the spot size by changing the location of the beam waist of the multiple second-eye light signal and the spatial separation between adjacent second-eye light signals similar to their counterparts. The first eye 50 and second eye 60 perceive a first-eye light signal and the corresponding second-eye light signal to produce binocular vision, in which the first-eye light signal and the corresponding second-eye light signal fuse together to form a binocular pixel for the viewer. Particularly in the present embodiment, with reference to FIGS. 10 and 11, the first-eye light signal emitted by the first light projector 1 and redirected from the first combiner 20 enters a first eye 50 of the viewer. A corresponding second-eye light signal emitted by the second light projector 3 and redirected from the second combiner 40 enters a second eye of the viewer. The first and second-eye light signals are perceived by the viewer to display a virtual binocular pixel 72 of an object 70 with a first depth (d1) that is related to a first angle (θ1) between the optical path extensions of the redirected first-eye light signal and the redirected second-eye light signal. More specifically, the extension of the light paths of the first-eye light signal and the second-eye light signal on the other side of the first and second combiner 40 virtually converges at a position P1. When the first angle θ1 between the two extensions of the optical path of the first-eye light signal and the second-eye light signal increases, the first depth d1 perceived by the viewer decreases; on the other hand, when the first angle θ1 decreases, the first depth d1 perceived by the viewer increases. The first depth d1 of the first virtual binocular pixel 72 can be calculated approximately by the following formula:

$$\mathrm{Tan}\left(\frac{\theta 1}{2}\right) = \frac{\text{interpupillary distance}}{2d1}$$

With reference to FIGS. 9-12, while applying the above method for forming an image frame, the pixel in the first image frame F1 and a corresponding pixel in the second image frame F2 form a virtual binocular pixel at a first depth which is related to a first angle between the first-eye light signal and the second-eye light signal projecting into the viewer's eyes. Upon receipt of the multiple light signals, the viewer would perceive multiple right pixels in the first image frame F1 for the object in the area A bounded by the extensions of the redirected second-eye light signals from the combiner. The area A is referred to as the field of view (FOV) for the second eye 50. Likewise, the multiple first-eye light signals in the second image frame F2 are redirected by the first combiner 20, pass the center of the left pupil 62, and are eventually received by the left retina 64. Upon receipt of the redirected first-eye light signals, the viewer would perceive multiple left pixels for the object in the area B bounded by the extensions of the redirected first-eye light signals. The area B is referred to as the field of view (FOV) for the first eye 50. When both multiple right pixels from the first image frame F1 and left pixels from the second image frame F2 are displayed in the area C which are overlapped by area A and area B, at least one second-eye light signal displaying one right pixel and a corresponding first-eye light signal displaying one left pixel are fused to display a virtual binocular pixel with a specific depth in the area C. The depth is related to an angle of the redirected second-eye light signal and the redirected first-eye light signal. Such angle is also referred to as a convergence angle.

Figure 11:
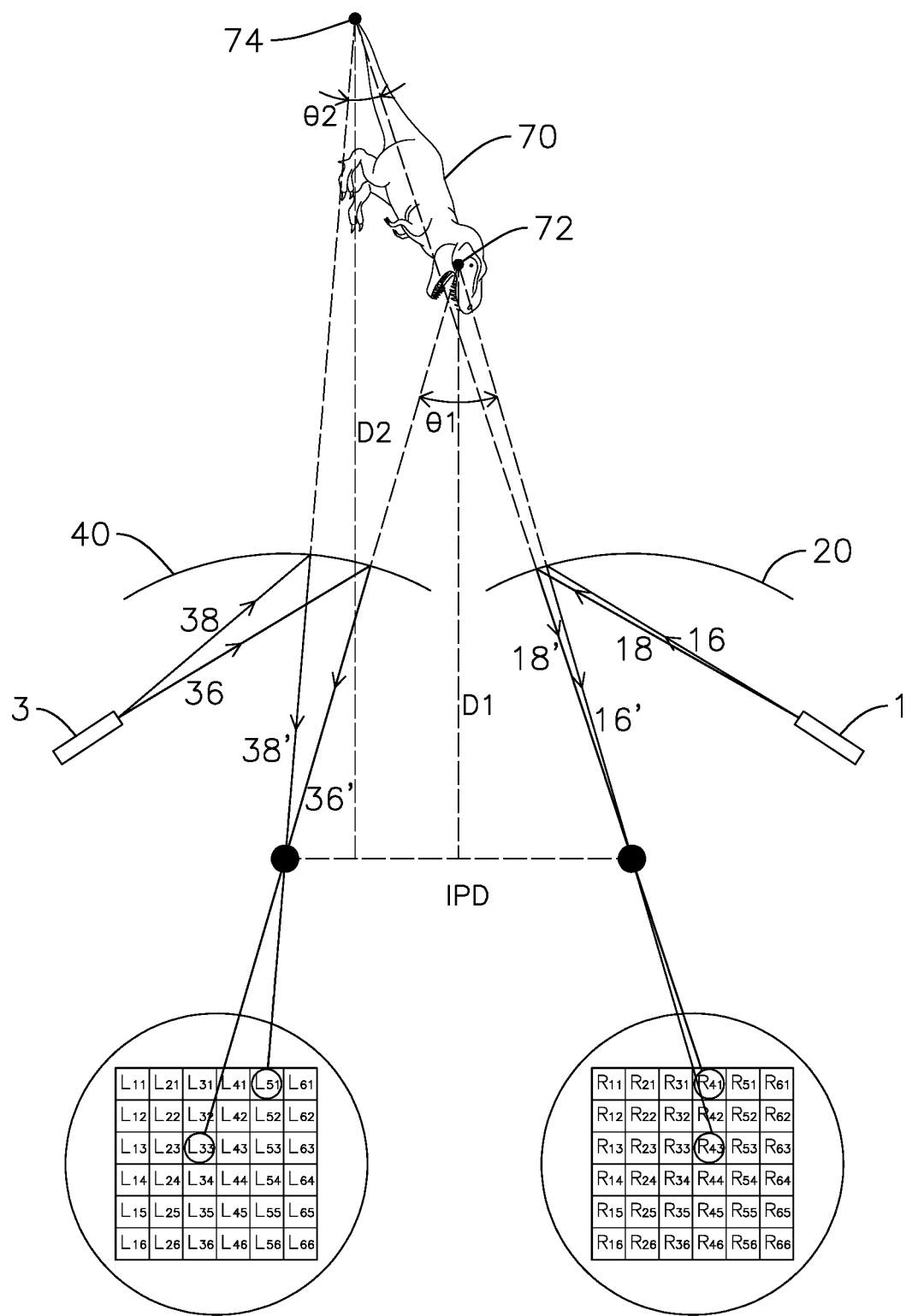
FIG. 11 is another schematic view of the display system in accordance to another embodiment of the present invention.

With further reference to FIGS. 9-12, as described above, the multiple second-eye light signals are generated by the second light project 3, redirected by the second combiner 40, and then directly scanned onto the right retina to form a right retina image on the right retina. Likewise, the multiple first-eye light signals are generated by first light project 1, redirected by the first combiner 20, and then scanned onto the left retina to form a left retina image on the left retina. In an embodiment, a right retina image contains 36 right pixels from the first image frame F1 in a 6×6 array and a left retina image also contains 36 left pixels from the second image frame F2 in a 6×6 array (FIG. 11). In another embodiment, a right retina image contains 921,600 right pixels from the first image frame F1 in a 1280×720 array and a left retina image also contains 921,600 left pixels from the second image frame F2 in a 1280×720 array. The object displaying system is configured to generate multiple second-eye light signals and corresponding multiple first-eye light signals which respectively form the right retina image on the right retina and left retina image on the left retina. As a result, the viewer perceives a virtual binocular object with specific depths in the area C because of image fusion. The first second-eye light signal 16 from the second light project 10 is received and reflected by the second combiner 40. The first redirected second-eye light signal 16', through the right pupil 52, arrives the right retina of the viewer to display the right pixel R34. The corresponding first-eye light signal 36 from the first light project 1 is received and reflected by the first combiner 20. The first redirected light signal 36', through the left pupil 62, arrives the left retina of the viewer to display the left retina pixel L33. As a result of image fusion, a viewer perceives the virtual binocular object with multiple depths where the depths are determined by the angles of the multiple redirected second-eye light signals and the corresponding multiple redirected first-eye light signals for the same object. The angle between a redirected second-eye light signal and a corresponding first-eye light signal is determined by the relative horizontal distance of the right pixel and the left pixel. In other words, the deeper a virtual binocular pixel is perceived by the viewer, the smaller the relative horizontal distance at X axis between the right pixel and left pixel forming such a virtual binocular pixel is. For example, the second virtual binocular pixel 74 is perceived by the viewer to have a larger depth (i.e., further away from the viewer) than the first virtual binocular pixel 72. Thus, the horizontal distance between the second right pixel and the second left pixel is smaller than the horizontal distance between the first right pixel and the first left pixel on the retina images.

In a variation of the above embodiments, the head wearable display system in accordance with the present invention may have a single combiner covering both eyes of the viewer. The curvature of the combiner is designed to receive and converge the multiple first-eye light signals and second-eye light signals and direct them into the viewer's first eye 50 and the viewer's second eye 60 respectively. Each of the multiple second-eye light signals has a dispersion angle when traveling from the first combiner 20 to the viewer's second eye 60.

With the method mentioned above, in an AR environment, a virtual image of a portion of the target object (e.g., an object in the target object) consisted of a multiple first and second-eye light signals can be rendered with multiple depths so the viewer can see the virtual image with best realism (with depth perception and 3D effect). Furthermore, based upon the multiple depth of different points of the portion of the surrounding, the virtual image can be superimposed onto the real image of the portion of the surrounding as supplement so the viewer can see the portion of the surrounding with higher VA. In this embodiment, the video information captured by the target object detection module 300 unit may be superimposed to the image seen by the viewer (as mentioned in U.S. Patent Provisional Application 63/074,444, which is incorporated by reference in its entirety herein). In another embodiment, the present invention is implemented as a VR system, the vision of the viewer may completely rely on the video information given by the VR system.

With the embodiments above, the eye tracking device 302 may respectively determine the location of fixation of the viewer's first eye 50 and the viewer's second eye. The eye tracking device 302 is configured to at least track locations of a viewer's both pupils. In addition, the eye tracking device may be configured to provide more information about the viewer's eyes, including but not limited to, eye movement, pupil size, gaze angle (view angle), and vergence angle of the viewer's each eye. Such eye information may be used to determine not only the directions and locations to project light signals for virtual objects but also the viewer's fixation locations and fixation depths. The eye tracking device may comprise a first camera to track the first eye 50 and a second camera to track the second eye 60. In addition to traditional eye tracking cameras, the first camera and the second camera may be built by the technologies of ultra-compact micro-electromechanical systems (MEMS). The first camera and the second camera may use ultra-red emitters and sensors to detect and derive various eye information. The eye tracking device 302 may further include an integrated inertial measurement unit (IMU), an electronic device that measures and reports a body's specific force, angular rate, and sometimes the orientation of the body, using a combination of accelerometers, gyroscopes, and sometimes magnetometers. The following describe an exemplary implementation of the present invention in which the first eye and the second eye of the viewer are both provided with a light emitter, a collimator, a light direction modifier and a combiner to obtained vision capability higher than normal human vision (e.g., higher than VA 1.0). The eye tracking device 302 determines the location of fixation of the viewer to determine the portion of target object where the viewer is viewing. The target object detection module 300 captures multiple image pixels of the target object. The multiple image pixels may be related to a portion of the target object or the entire target object. Since each portion of the target object may have variable position and depth relative to the viewer, the target object detection module 300 determines a distance or corresponding depths of at least a portion of the target object at which the viewer is fixated on. As discussed earlier, for rendering the virtual image of different portions of the target object having different depths, the dispersion angle of each of the multiple light signals and a spatial separation between centers of any two adjacent light signals rending the images of the objects need to be modified according to the depth variation. Furthermore, the target object mentioned herein may refer to the surrounding environment of the viewer or individual objects in the surrounding environment. If the target object or a portion of the target object occupies a relatively large portion of the total FOV of the viewer, the virtual image of the target object may be divided into multiple FOVs. Depending on the location of fixation on the target object, a number of the multiple first-eye light signals per degree in a first field of view (which is also the number of the first-eye light signals per degree) containing the first portion of the target object may exceed a number of the multiple first-eye light signals per degree in a second field of view containing the second portion of the target object; meanwhile, a number of the multiple second-eye light signals per degree in a third field of view (which is also the number of the second-eye light signals per degree) containing the first portion of the target object may exceed a number of the multiple second-eye light signals per degree in a fourth field of view containing the second portion of the target object. The first field of view of the first eye corresponds to the third field of view of the second eye, which both render the first portion of the target object. The second field of view of the first eye corresponds to the fourth field of view of the second eye, which both render the second portion of the target object. In this embodiment, the spot size and the spatial separation of the multiple first-eye light signals and second-eye light signals are dynamically modified according to the location fixation of the viewer.

The dispersion angle of each of the multiple light signals and a spatial separation between centers of any two adjacent light signals rending the images of the target objects mentioned above may be modified according to the aforementioned method; namely, by modifying the projection duration of the light emitter, the distance between the combiner and the collimator, the projection frequency of the light emitter, and the swing frequency of the light direction modifier. In practice, the both eyes of the viewer can constantly change the location of fixation for viewing different objects or different portion of the target object having different 3-dimensional position (which includes depth). Or in some cases, both eyes of the viewer may be fixated on a moving object so the viewer need to constantly change the location of fixation. Therefore, the projection duration of the light emitter, the distance between the combiner and the collimator, the projection frequency of the light emitter, and the swing frequency of the light direction modifier may need to be modified according to the location of fixation dynamically (thereby, the depth of the object being fixated by the viewer).

Figure 13:
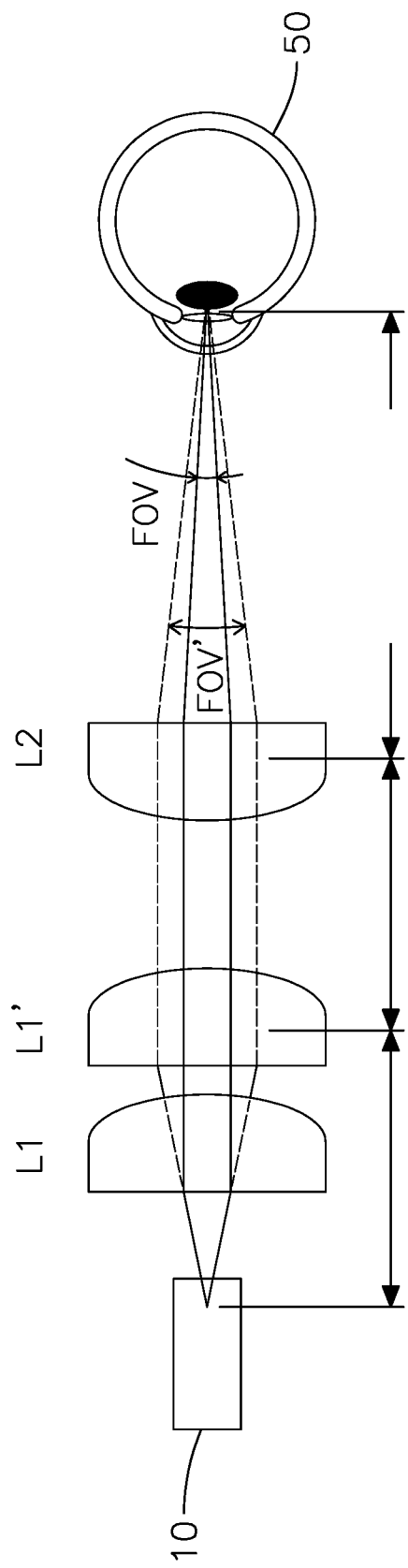
FIG. 13 is a schematic view of an embodiment of the optical assembly in accordance with the present invention.
Figure 14:
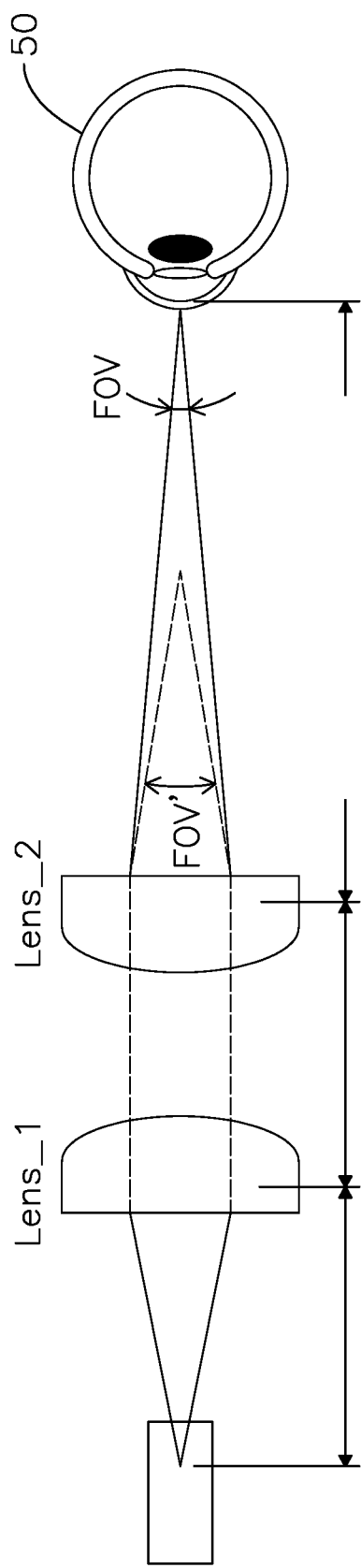
FIG. 14 is another schematic view of an embodiment of the optical assembly in accordance with the present invention.

With reference to FIGS. 13-14, further in other variations of the present embodiment, an optical assembly may be disposed between the light emitter and the collimator mentioned above to alter an area of a predetermined cross section of an optical path of the multiple light signals. Specifically, the optical assembly containing lens may be implemented for altering optical path of the multiple first-eye light signals 1000 from the first light emitter 10 to the first combiner 20 to change a projection area or a cross sectional size (i.e., spot size) of each of the multiple first-eye light signals. For example, with reference to FIG. 13, the optical assembly comprises Lens_1 and Lens_2. Lens_1, and Lens_2 are convex lenses. A light emitter is originally placed at the focal length of Lens_1. When Lens_1 is moved to a new position shown as Lens_1', the distance between the light emitter and Lens_1 is increased; as a result, the amount of light divergent angle from the LBS is increased. Thereby, the projection area or a cross sectional size of each of the multiple first-eye light signals 1000 is also increased, which causes the spot size of the light signal to increase. In another embodiment, with reference to FIG. 14, the optical assembly comprises Lens_1, Lens_2, and the LBS. Lens_1 and Lens_2 are convex lenses. The light emitter is placed at the focal length of Lens_1 so the light signals emitted by the light emitter become substantially parallel light signals after passing Lens_1. In this mode, the focal length of Lens_2 can be selected to decrease the FOV. As an example, changing the focal length of Lens_2 from 50 mm to 100 mm (and placing the pupil 100 mm away from Lens_2, which is at the focus of Lens_2) can decrease a half of the FOV. When the present invention is realized in the form of head wearable devices or AR/VR glasses, Lens_2 can be implemented as the combiner. However, Lens_2 can also be implemented as other optical elements in other embodiments.

In some embodiments, to further improve FOV, the method shown in FIG. 13 and FIG. 14 can be implemented simultaneously without excluding each other. When the present invention is realized in the form of head wearable devices or AR/VR glasses, Lens_2 can be implemented as the combiner. However, Lens_2 can also be implemented as other optical elements in other embodiments.

The present invention may assist viewers with cornea and retina impairment (for example: age-related macular degeneration). For people having normal eye condition, the best area for receiving light is the macular portion; but for some people with macular degeneration or other eye diseases, other area of the eye may be preferred for sensing light and receiving image pixels. Therefore, the present invention can be used to project light signals to the healthy region of the retina to produce image of the surrounding for the viewer to see. Before implementing the present invention, corneal topography and retina perimeter may be used to find the best optical path and location for light signals to be projected to the viewer's eyes. Meanwhile, it is needed to identify the best incidence angle for entering an area of the cornea having the least defect for projecting light on a portion of the retina having the least defect. In order to achieve this function, the combiner may be designed to have an oval-shaped concave surface, and/or with a customized reflective angle.

In the present invention, the combiner 210, 410 receives, redirects, and converges multiple light signals generated by the light emitter 10, 30. In one embodiment, the combiner 210, 410 reflects the multiple light signals so that the redirected light signals are on the same side of the combiner 210, 410 as the incident light signals. In another embodiment, the combiner 210, 410 refracts the multiple light signals so that the redirected light signals are on the different side of the combiner 210, 410 from the incident light signals. When the combiner 210, 410 also functions as a refractor, the reflection ratio of the combiner can vary widely, such as 20%-80%, in part depending on the power of the light signal generator. People with ordinary skill in the art know how to determine the appropriate reflection ratio based on characteristics of the light emitters 10, 30 and the combiners 210, 410. Besides, in one embodiment, the combiner 210, 410 is optically transparent to the ambient (environmental) lights from the opposite side of the incident light signals. The degree of transparency can vary widely depending on the application. For AR/MR application, the transparency is preferred to be more than 50%, such as about 75% in one embodiment. In addition to redirecting the light signals, the combiner 210, 410 may converge the multiple light signals forming the combiner images so that they can pass through the pupils and arrive the retinas of the viewer's both eyes. The combiner 210, 410 may be made of glasses or plastic materials like lens, coated with certain materials such as metals to make it partially transparent and partially reflective. One advantage of using a reflective combiner instead of a wave guide in the prior art for directing light signals to the viewer's eyes is to eliminate the problem of undesirable diffraction effects, such as multiple shadows, color displacement . . . etc. The combiner 210, 410 may be a holographic combiner but not preferred because the diffraction effects can cause multiple shadows and RGB displacement. In some embodiments, we may want to avoid using holographic combiner. To avoid the interference of environmental lights, the present invention may utilize a shutter to substantially reduce environmental lights from entering the viewer's eyes. In one embodiment, the shutter may be a mechanical unit to block environment lights. In another embodiment, the shutter may be activated by reducing transparency of the first combiner and the second combiner 210, 410.

Figure 15:
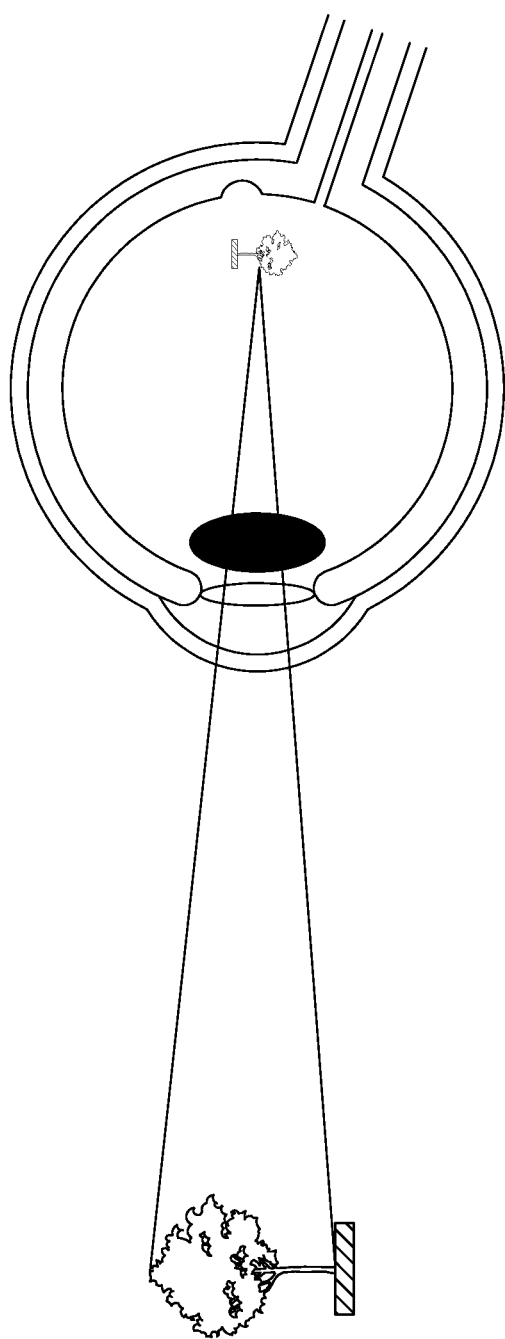
FIG. 15 is a schematic view for describing an application of the present invention.

In some embodiments, the present invention can be implemented as a head wearable device for vision correction or vision training. The present invention can be used for correcting or improving eye disorders such as, but not limited to, myopia, hyperopia, strabismus, amblyopia, and convergence disorders. The principle of correcting or improving the aforementioned diseases is targeting the eye of the viewer with more visual stimulus. In other words, giving eyes with proper stimulus can promote visual acuity and muscle movement improvement of the eyes. With reference to FIG. 15, as an example, the present invention can be used to correct the vision of people having myopia or hyperopia. In this embodiment, the head wearable device with AR/VR system is able to capture real time image pixels of a target object or the environment surrounding to be viewed by a viewer via the target object detection module 300 and project a pixelized image having depth perception to the viewer. The system of the pixelized image can be focused at a desirable location by the methods mention earlier. For example, the pixelized image can be focused right in front of the retina for people with myopia, or right behind the retina for people with hyperopia, so as to stimulate the ciliary muscle to adjust the lens of the eye for the correctly focusing the image on the retina. By using this method, the muscles of the eyes can be trained.

The present invention is able to capture real time image pixels of a target object, or the environment surrounding and reproduces a 3-dimensional digital image having enhanced image quality to a viewer of the AR/VR system. The viewer of the present invention can adjust the image quality to achieve better than normal visual acuity (e.g., higher than 20/20 vision or VA 1.0). Furthermore, the present invention may help people with vision impairment or replace the traditional prescription eyeglasses to perform vision correction for people having myopia or hyperopia . . . etc. The present invention can be used by health care professionals, military personals, precision processing industry sectors, aerospace pilots, law enforcement personals, emergency and rescue personals, and athletes . . . etc.

Although particular embodiments of the present invention have been described in detail for purposes of illustration, various modifications and enhancements may be made without departing from the spirit and scope of present discloser.

What is claimed is:

1. A head wearable display system comprising:
    a target object detection module receiving multiple image pixels of a first portion and a second portion of a target object, and the corresponding depths;
    a first light emitter emitting multiple first-eye light signals to display a first-eye virtual image of the first portion and the second portion of the target object for a viewer;
    a first light direction modifier for respectively varying a light direction of each of the multiple first-eye light signals emitted from the first light emitter;
    a first collimator, disposed between the first light emitter and the first light direction modifier, to adjust a beam waist location of each of the multiple first-eye light signals so that the multiple first-eye light signals are separable from each other;
    a first combiner, for redirecting and converging the multiple first-eye light signals towards a first eye of the viewer; and
    wherein the first-eye virtual image of the first portion of the target object in a first field of view has a greater number of the multiple first-eye light signals per degree than that of the first-eye virtual image of the second portion of the target object in a second field of view,
    wherein the multiple first-eye light signals are separable from each other if a spatial distance between centers of any two adjacent first-eye light signals on a cross-sectional plane of light path is larger than half of a greatest diameter of the two adjacent first-eye light signals.

2. The head wearable display system of claim 1, wherein the number of the multiple first-eye light signals per degree for the first-eye virtual image of the target object is adjusted based on the corresponding depth of the target object.

3. The head wearable display system of claim 1, wherein the number of the multiple first-eye light signals per degree for the first-eye virtual image of the first portion of the target object in the first field of view exceeds 120.

4. The head wearable display system of claim 1, wherein a projection duration of the first light emitter for each of the multiple first-eye light signals is varied to modify a spot size of the multiple first-eye light signals for the first-eye virtual image of the first portion of the target object.

5. The head wearable display system of claim 1, wherein a projection frequency of the first-eye light emitter is varied to modify the number of the multiple first-eye light signals per degree for the first-eye virtual image of the first portion of the target object.

6. The head wearable display system of claim 1, wherein a swing frequency of the first light direction modifier is varied to modify the number of the multiple first-eye light signals per degree for the first-eye virtual image of the first portion of the target object.

7. The head wearable display system of claim 6, wherein a light direction of the multiple first-eye light signals is varied at the swing frequency with respect to time for displaying the first-eye virtual image of the target object and the swing frequency is non-constant.

8. The head wearable display system of claim 7, wherein the light direction comprises a first coordinate component and a second coordinate component; the first coordinate component and the second coordinate component of the light direction of first-eye light signals are respectively varied at a first swing frequency and a second swing frequency with respect to time for displaying the first-eye virtual image of the target object; and the first swing frequency or the second swing frequency is non-constant.

9. The head wearable display system of claim 7, wherein each of the multiple first-eye light signals forms a pixel in the first-eye virtual image of the target object and a pixel density in the first-eye virtual image is not uniform.

10. The head wearable display system of claim 9, wherein the first portion of the target object is a central portion, the second portion of the target object is a peripheral portion, and the first-eye virtual image of the first portion of the target object has a pixel density higher than the first-eye virtual image of the second portion of the target object.

11. The head wearable display system of claim 1, wherein a spot area of each of two adjacent first-eye light signals on a cross-sectional plane of light path approximately adjoins each other.

12. The head wearable display system of claim 1, wherein the first light emitter comprises a red laser diode, a green laser diode, and a blue laser diode.

13. The head wearable display system of claim 1, wherein a first distance between the first light direction modifier and the first collimator is varied to modify a spot size of the multiple first-eye light signals for the first-eye virtual image of the first portion of the target object.

14. The head wearable display system of claim 1, further comprising:
    a second light emitter emitting multiple second-eye light signals, corresponding to the multiple first-eye light signals, to display a second-eye virtual image of the first portion and the second portion of the target object for the viewer;
    a second light direction modifier for respectively varying a light direction of each of the multiple second-eye light signals emitted from the second light emitter;
    a second collimator, disposed between the second light emitter and the second light direction modifier, to adjust a beam waist location of each of the multiple second-eye light signals so that the multiple second-eye light signals are separable from each other;
    wherein the first combiner receives and converges the multiple second-eye light signals towards a second eye of the viewer;
    wherein the second-eye virtual image of the first portion of the target object in a third field of view has a greater number of the multiple second-eye light signals per degree than that of the second-eye virtual image of the second portion of the target object in a fourth field of view; and wherein a first-eye light signal and a corresponding second-eye light signal are perceived by the viewer to display a virtual binocular pixel of a binocular virtual image of the target object with a depth that is related to an angle between the first-eye light signal and the corresponding second-eye light signal projected into the viewer's eyes.

15. The head wearable display system of claim 1, further comprising:

a second light emitter emitting multiple second-eye light signals, corresponding to the multiple first-eye light signals, to display a second-eye virtual image of the first portion and the second portion of the target object for the viewer;

a second light direction modifier for respectively varying a light direction of each of the multiple second-eye light signals emitted from the second light emitter;

a second collimator, disposed between the second light emitter and the second light direction modifier, to adjust a beam waist location of each of the multiple second-eye light signals so that the multiple second-eye light signals are separable from each other;

a second combiner for redirecting and converging the multiple second-eye light signals towards a second eye of the viewer;

wherein the second-eye virtual image of the first portion of the target object in a third field of view has a greater number of the multiple second-eye light signals per degree than that of the second-eye virtual image of the second portion of the target object in a fourth field of view; and wherein a first-eye light signal and a corresponding second-eye light signal are perceived by the viewer to display a virtual binocular pixel of a binocular virtual image of the target object with a depth that is related to an angle between the first-eye light signal and the corresponding second-eye light signal projected into the viewer's eyes.

16. The head wearable display system of claim 15, further comprising an eye tracking device for respectively determining a visual axis of the viewer's first eye and the viewer's second eye to determine a location of fixation.

17. The head wearable display system of claim 16, wherein a projection frequency of the first light emitter and a projection frequency of the second light emitter are varied according to the location of fixation to respectively modify the number of the multiple first-eye light signals per degree for the first-eye virtual image of the first portion of the target object and the number of the multiple second-eye light signals per degree for the second-eye virtual image of the first portion of the target object.

18. The head wearable display system of claim 16, wherein a swing frequency of the first light direction modifier and the swing frequency of the second light direction modifier are varied according to the location of fixation to respectively modify the number of the multiple first-eye light signals per degree for the first-eye virtual image of the first portion of the target object and the number of the multiple second-eye light signals per degree for the second-eye virtual image of the first portion of the target object.

19. The head wearable display system of claim 16, wherein a projection frequency of the first light emitter and a projection frequency of the second light emitter are varied according to the location of fixation to respectively modify the number of the multiple first-eye light signals per degree for the first-eye virtual image of the first portion of the target object and the number of the multiple second-eye light signals per degree for the second-eye virtual image of the first portion of the target object.

20. The head wearable display system of claim 16, wherein a projection duration of the first light emitter for each of the multiple first-eye light signals and a projection duration of the second light emitter for each of the multiple second-eye light signals are varied according to the location of fixation to respectively modify a spot size of the multiple first-eye light signals for the first-eye virtual image of the first portion of the target object and a spot size of the multiple second-eye light signals for the second-eye virtual image of the first portion of the target object.

21. The head wearable display system of claim 16, wherein a first distance between the first light direction modifier and the first collimator and a second distance between the second light direction modifier and the second collimator are varied according to the location of fixation to respectively modify a spot size of the multiple first-eye light signals for the first- eye virtual image of the first portion of the target object and a spot size of the multiple second- eye light signals for the second-eye virtual image of the first portion of the target object.

22. The head wearable display system of claim 15, wherein the target object detection module determines a 3-dimensional coordinate for each of the multiple image pixels of the first portion and the second portion of the target object.

23. The head wearable display system of claim 15, wherein the binocular virtual image of the target object is displayed to superimpose on the target object.

24. The head wearable display system of claim 15, further comprising a shutter to substantially reduce environmental lights from entering the viewer's eyes.

25. The head wearable display system of claim 24, wherein the shutter is activated by reducing transparency of the first combiner and the second combiner.

* * * * *